United States Patent
Takeda et al.

(10) Patent No.: US 9,380,570 B2
(45) Date of Patent: Jun. 28, 2016

(54) RADIO BASE STATION APPARATUS, USER TERMINAL, RADIO COMMUNICATION SYSTEM AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 51 days.

(21) Appl. No.: 14/386,244

(22) PCT Filed: Mar. 13, 2013

(86) PCT No.: PCT/JP2013/057042
§ 371 (c)(1),
(2) Date: Sep. 18, 2014

(87) PCT Pub. No.: WO2013/141114
PCT Pub. Date: Sep. 26, 2013

(65) Prior Publication Data
US 2015/0043474 A1    Feb. 12, 2015

(30) Foreign Application Priority Data
Mar. 19, 2012  (JP) ................................ 2012-062690

(51) Int. Cl.
*H04W 4/00* (2009.01)
*H04W 72/04* (2009.01)
(Continued)

(52) U.S. Cl.
CPC ............ *H04W 72/042* (2013.01); *H04B 7/026* (2013.01); *H04B 7/0452* (2013.01); *H04B 7/068* (2013.01);
(Continued)

(58) Field of Classification Search
CPC ... H04W 72/04; H04W 72/042; H04W 48/00; H04W 88/08; H04W 4/00; H04L 1/00; H04L 5/0023; H04L 5/0037; H04L 5/0051; H04L 5/0053; H04B 7/0617; H04B 7/0697; H04B 7/0452; H04B 7/026; H04B 7/0678; H04B 7/068; H04B 7/0691; H04B 7/0865
See application file for complete search history.

(56) References Cited

U.S. PATENT DOCUMENTS

2010/0002800 A1* 1/2010 Kim ...................... H04L 5/0037
375/295
2010/0322176 A1* 12/2010 Chen ...................... H04B 7/024
370/329

(Continued)

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)" Dec. 2008 (18 pages).

(Continued)

*Primary Examiner* — Kevin Mew
(74) *Attorney, Agent, or Firm* — Osha Liang LLP

(57) ABSTRACT

A radio base station apparatus has a multiplication section that multiplies downlink control information allocated to an extended downlink control channel resource region in a resource block, by a user terminal-specific weight; and a reporting section that reports one group, among a plurality of groups that are configured by selecting different antenna ports from a plurality of antenna ports corresponding to the number of transmission layers of a demodulation reference signal, to the user terminal, and in each group, extended downlink control channel resource regions in the resource block and antenna ports to constitute the group are associated with each other; and the multiplication section multiplies a demodulation reference signal corresponding to an antenna port in the one group that is associated with the extended downlink control channel resource regions where the downlink control information is allocated, by the weight.

14 Claims, 15 Drawing Sheets

(51) Int. Cl.
- *H04L 1/00* (2006.01)
- *H04L 5/00* (2006.01)
- *H04W 48/00* (2009.01)
- *H04B 7/06* (2006.01)
- *H04B 7/04* (2006.01)
- *H04B 7/02* (2006.01)
- *H04B 7/08* (2006.01)
- *H04W 88/08* (2009.01)

(52) U.S. Cl.
CPC ............ *H04B 7/0617* (2013.01); *H04B 7/0678* (2013.01); *H04B 7/0691* (2013.01); *H04B 7/0697* (2013.01); *H04B 7/0865* (2013.01); *H04L 1/00* (2013.01); *H04L 5/0023* (2013.01); *H04L 5/0037* (2013.01); *H04L 5/0053* (2013.01); *H04W 4/00* (2013.01); *H04W 48/00* (2013.01); *H04L 5/0051* (2013.01); *H04W 72/04* (2013.01); *H04W 88/08* (2013.01)

(56) References Cited

U.S. PATENT DOCUMENTS

| | | | | |
|---|---|---|---|---|
| 2011/0013615 A1* | 1/2011 | Lee | ...................... | H04L 5/0023 370/344 |
| 2011/0064159 A1* | 3/2011 | Ko | .......................... | H04B 7/04 375/267 |
| 2011/0110444 A1* | 5/2011 | Roh | ...................... | H04L 1/0003 375/260 |
| 2011/0194551 A1* | 8/2011 | Lee | ...................... | H04B 7/0626 370/342 |
| 2011/0228735 A1* | 9/2011 | Lee | ...................... | H04L 5/0051 370/329 |
| 2012/0155561 A1* | 6/2012 | Seo | ...................... | H04B 7/15542 375/260 |
| 2012/0300278 A1* | 11/2012 | Tian | ...................... | G02B 26/005 359/228 |
| 2013/0010745 A1* | 1/2013 | Ko | ........................ | H04B 7/0404 370/329 |
| 2013/0016604 A1* | 1/2013 | Ko | ........................ | H04B 7/0404 370/216 |
| 2013/0163461 A1* | 6/2013 | Kim | ...................... | H04B 7/0626 370/252 |
| 2014/0016596 A1* | 1/2014 | Kim | ........................ | H04L 5/001 370/329 |
| 2014/0050159 A1* | 2/2014 | Frenne | ................ | H04W 72/042 370/329 |
| 2014/0064203 A1* | 3/2014 | Seo | ........................ | H04W 28/06 370/329 |

OTHER PUBLICATIONS

NTT DOCOMO; "DM-RS Antenna Port Association for E-PDCCH in Rel-11;" 3GPP TSG RAN WG1 Meeting #68bis, R1-121474; Jeju, Korea, Mar. 26-30, 2012 (4 pages).

Decision to Grant a Patent for corresponding Japanese Application No. 2012-062690, mailed May 13, 2014 (4 pages).

International Search Report for corresponding International Application No. PCT/JP2013/057042, mailed Jun. 18, 2013 (1 page).

* cited by examiner

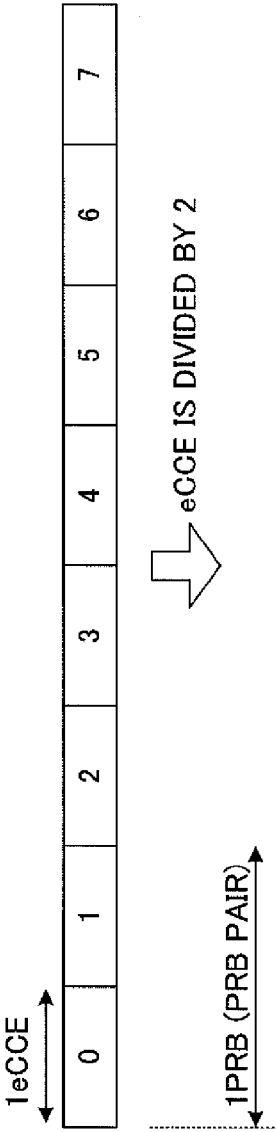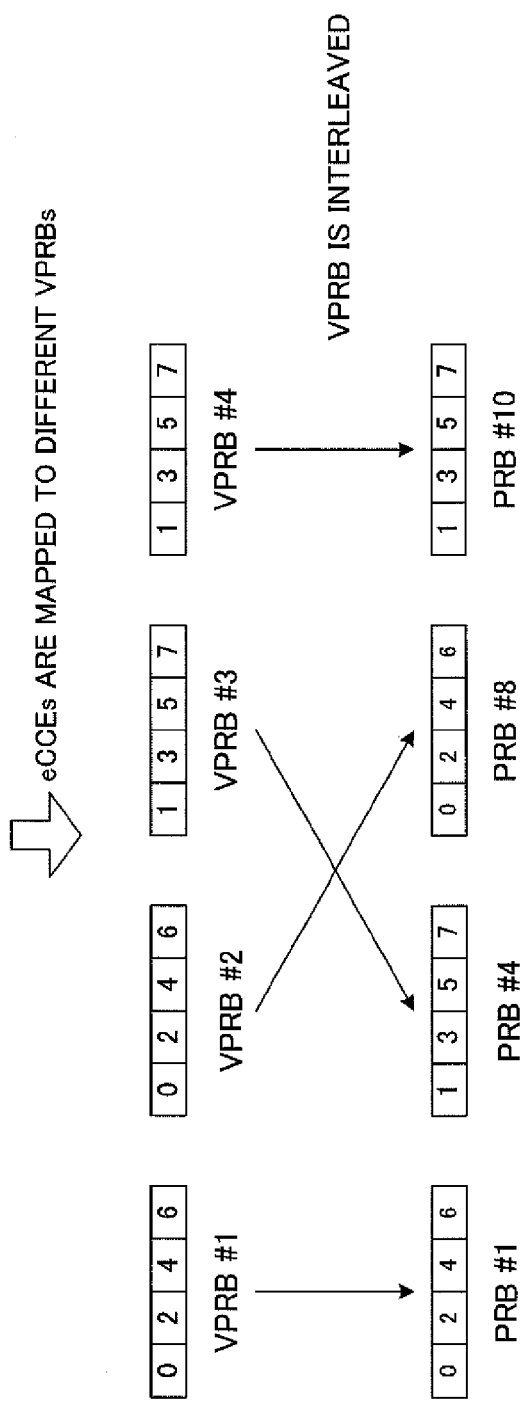
FIG.5A
FIG.5B
FIG.5C

RADIO BASE STATION APPARATUS, USER TERMINAL, RADIO COMMUNICATION SYSTEM AND RADIO COMMUNICATION METHOD

TECHNICAL FIELD

The present invention relates to a radio base station apparatus, a user terminal, a radio communication system and a radio communication method in a next-generation radio communication system.

BACKGROUND ART

In a UMTS (Universal Mobile Telecommunications System) network, long-term evolution (LTE) has been under study for the purposes of further increasing high-speed data rates, providing low delay and so on (non-patent literature 1). In LTE, as multiple access schemes, a scheme that is based on OFDMA (Orthogonal Frequency Division Multiple Access) is used for downlink channels (downlink), and a scheme that is based on SC-FDMA (Single Carrier Frequency Division Multiple Access) is used for uplink channels (uplink).

Also, successor systems of LTE (referred to as, for example, "LTE-Advanced" or "LTE enhancement" (hereinafter referred to as "LTE-A")) are under study for the purpose achieving of further broadbandization and increased speed from LTE. In LTE (Rel. 8) and LTE-A (Rel. 9 and Rel. 10), MIMO (Multi Input Multi Output) techniques are under study as radio communication techniques to transmit and receive data by a plurality of antennas and improve spectral efficiency. According to MIMO techniques, a plurality of transmitting/receiving antennas are provided in a transmitter/receiver, so that different transmission information sequences are transmitted from different transmitting antennas at the same time.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in LTE-A, which is a successor system of LTE, multiple-user MIMO (MU-MIMO) transmission to transmit transmission information sequences from different transmitting antennas to different users at the same time is under study. This MU-MIMO transmission is also applied to a Hetnet (Heterogeneous network) and CoMP (Coordinated Multi-Point) transmission.

In future systems, the capacity of downlink control channels to transmit downlink control information is expected to run short due to the increase of the number of users to be connected to a radio base station apparatus. Consequently, there is a threat that conventional radio resource allocation methods will fail to optimize the performance of future systems such as MU-MIMO transmission.

As a method of solving this problem, a method of extending the radio resource region for downlink control channels and transmitting more downlink control information may be possible. In this case, how to configure the demodulation reference signals for demodulating the downlink control channels allocated to the extended radio resource region (hereinafter referred to as "extended downlink control channel") becomes a problem.

The present invention has been made in view of the above, and it is therefore an object of the present invention to provide a radio base station apparatus, a user terminal, a radio communication system and a radio communication method that can provide demodulation reference signals that are suitable for an extended downlink control channel.

Solution to Problem

The radio base station apparatus of the present invention has a multiplication section that multiplies downlink control information allocated to an extended downlink control channel resource region in a resource block, by a user terminal-specific weight, and a reporting section that reports one group, among a plurality of groups that are configured by selecting different antenna ports from a plurality of antenna ports corresponding to the number of transmission layers of a demodulation reference signal, to the user terminal, and, in this radio base station apparatus, in each group, extended downlink control channel resource regions in the resource block and antenna ports to constitute the group are associated with each other, and the multiplication section multiplies a demodulation reference signal corresponding to an antenna port in the one group that is associated with the extended downlink control channel resource regions where the downlink control information is allocated, by the weight.

The user terminal of the present invention has an acquisition section that acquires group information, which represents one group reported from a radio base station apparatus among a plurality of groups that are formed by selecting different antenna ports from a plurality of antenna ports corresponding to the number of transmission layers of a demodulation reference signal, an estimation section that estimates weights by which demodulation reference signals to correspond to antenna ports belonging to the one group are multiplied, and a demodulation section that demodulates downlink control information, and, in this user terminal, in each group, extended downlink control channel resource regions in a resource block and antenna ports to constitute the group are associated with each other, and the demodulation section demodulates the downlink control information using weight an estimation value of an antenna port in the one group that is associated with the extended downlink control channel resource regions where the downlink control information is allocated.

The radio communication method of the present invention includes the steps of, at a radio base station apparatus, multiplying downlink control information allocated to an extended downlink control channel resource region in a resource block, by a user terminal-specific weight, and reporting one group, among a plurality of groups that are configured by selecting different antenna ports from a plurality of antenna ports corresponding to the number of transmission layers of a demodulation reference signal, to the user terminal, and, in this radio communication method, in each group, the extended downlink control channel resource regions in the resource block and antenna ports to constitute the group are associated with each other, and in the step of multiplication, the radio base station apparatus multiplies a demodulation reference signal corresponding to an antenna port associated with the extended downlink control channel resource regions where the downlink control information is allocated in the one group, by the weight.

The radio communication system of the present invention has a radio base station apparatus which has a multiplication section that multiplies downlink control information allocated to an extended downlink control channel resource region in a resource block, by a user terminal-specific weight, and a reporting section that reports one group, among a plurality of groups that are configured by selecting different antenna ports from a plurality of antenna ports corresponding to the number of transmission layers of a demodulation reference signal, to the user terminal, and a user terminal which has an acquisition section that acquires group information, which represents the one group reported from the radio base station apparatus, an estimation section that estimates weights by which demodulation reference signals to correspond to antenna ports belonging to the one group are multiplied, and a demodulation section that demodulates the downlink control information, and, in this radio communication system, in each group, extended downlink control channel resource regions in the resource block and antenna ports to constitute the group are associated with each other, and the multiplication section multiplies a demodulation reference signal corresponding to an antenna port in the one group that is associated with the extended downlink control channel resource regions where the downlink control information is allocated, by the weight, and the demodulation section demodulates the downlink control information using a weight estimation value of the antenna port in the one group that is associated with the extended downlink control channel resource regions where the downlink control information is allocated.

Advantageous Effects of Invention

According to the present invention, it is possible to provide demodulation reference signals that are suitable for an extended downlink control channel.

BRIEF DESCRIPTION OF DRAWINGS

FIG. 5 provides diagrams to show an example of distributed mapping of an extended PDCCH;

DESCRIPTION OF EMBODIMENTS

Figure 1:
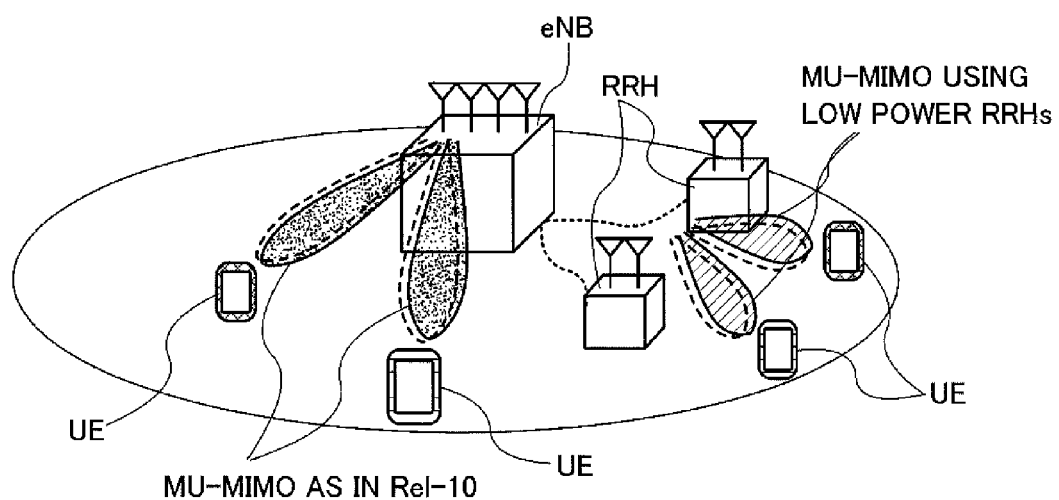
FIG. 1 is a schematic diagram of a Hetnet where MU-MIMO is applied.

FIG. 1 is a diagram to show an example of a Hetnet where MU-MIMO transmission is applied. The system shown in FIG. 1 is configured in layers by providing small base station apparatuses (for example, RRHs (Remote Radio Heads)) having local coverage areas in the coverage area of a radio base station apparatus (for example, eNB (eNodeB)). In downlink MU-MIMO transmission in this system, data for a plurality of user terminal UEs (User Equipment) #1 and #2 is transmitted at the same time from a plurality of antennas of the radio base station apparatus. Also, from a plurality of antennas of a plurality of small base station apparatuses, data for a plurality of user terminal UEs #3 and #4 is also transmitted at the same time.

Figure 2:
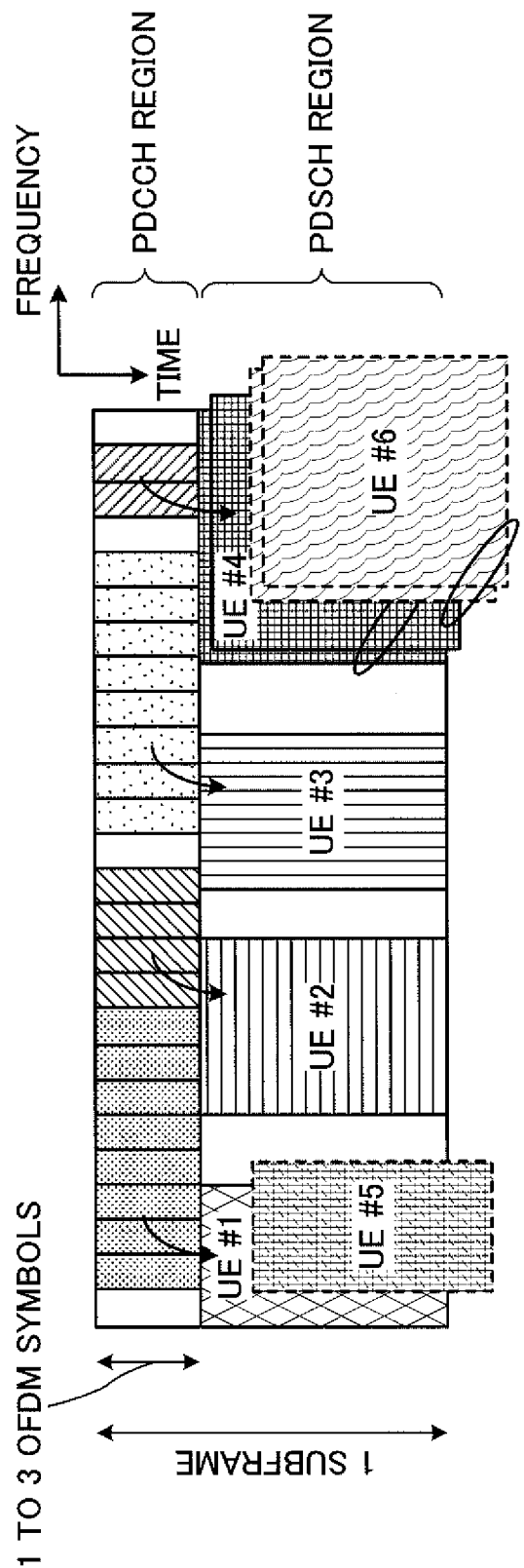
FIG. 2 is a diagram to show an example of a subframe where downlink MU-MIMO transmission is performed.

FIG. 2 is a diagram to show an example of a radio frame (for example, one subframe) where downlink MU-MIMO transmission is applied. As shown in FIG. 2, in a system where MU-MIMO transmission is applied, a predetermined number of OFDM symbols (one to three OFDM symbols) from the top of each subframe are secured as a radio resource region (PDCCH region) for a downlink control channel (PDCCH: Physical Downlink Control Channel). Also, in radio resources after a predetermined number of symbols from the top of the subframe, a radio resource region (PDSCH region) for a downlink shared data channel (PDSCH: Physical Downlink Shared Channel) is secured.

In the PDCCH region, downlink control information (DCI) for user terminal UEs (here, UEs #1 to #4) is allocated. The downlink control information (DCI) includes allocation information in the PDSCH region. In this way, in each subframe, downlink data signals for user terminal UEs and downlink control information (DCI) signals for receiving that downlink data are time-division-multiplexed and transmitted.

In MU-MIMO transmission, it is possible to transmit data for a plurality of user terminal UEs in the same time and the same frequency. Consequently, in the PDSCH region of FIG. 2, it may be possible to multiplex data for user terminal UE #1 and data for user terminal UE #5 over the same frequency region. Similarly, it may also be possible to multiplex data for user terminal UE #4 and data for user terminal UE #6 over the same frequency region.

However, when allocating downlink control information for many user terminal UEs to the PDCCH region, cases might occur where, as shown in FIG. 2, the PDCCH region for transmitting downlink control information corresponding to user terminal UEs #5 and #6 runs short. In this case, the number of user terminal UEs that can be multiplexed over the PDSCH region is limited.

In this way, even if the number of user terminals to be multiplexed over the same radio resources is increased by MU-MIMO transmission, when the PDCCH region for transmitting downlink control information runs short, there is a threat that it is not possible to optimize the efficiency of use of the PDSCH region.

To solve such shortage of the PDCCH region, it may be possible to extend the radio resource region for the PDCCH beyond the control region of maximum three OFDM symbols from the subframe top (that is, extend the PDCCH region into the conventional PDSCH region). For example, a method of frequency-division-multiplexing the PDSCH and the PDCCH may be possible (frequency-division (FDM) approach). A PDCCH that is frequency-division-multiplexed with a PDSCH like this is referred to as an "extended PDCCH" (also referred to as an "extended downlink control channel," "E-PDCCH," "enhanced PDCCH," "FDM-type PDCCH," "UE-PDCCH" and so on), for differentiation from a conventional PDCCH.

When the frequency division approach is applied, it becomes possible to achieve beam forming gain by demodulating extended PDCCHs using demodulation reference signals (DM-RSs), which are user-specific reference signals (also referred to as "user-specific reference signals," "UE-specific RSs," "DRSs" (Dedicated Reference Signals) and so on (hereinafter referred to as "DM-RSs")). In this case, beam forming for individual user terminal UEs becomes possible and sufficient received quality is achieved, so that this may be effective for increased capacity.

Now, as a method of allocating extended PDCCHs to each user, similar to a conventional PDCCH, either a method of allocating in control channel element (CCE) units, which are formed with a plurality of resource element groups (REGs), over the entire system band ("with cross interleaving"), and a method of allocating in predetermined resource (for example, enhanced control channel element (eCCE)) units, within physical resource blocks (PRBs) distributed over the entire system band ("without cross interleaving"), may be applied.

In the method "without cross interleaving," DM-RSs are arranged in PRBs where extended PDCCHs may be arranged. Consequently, extended PDCCHs can be demodulated using DM-RSs. In this case, channel estimation using DM-RSs is made possible, so that it is possible to implement effective beam forming for each user terminal UE.

Figure 3A:
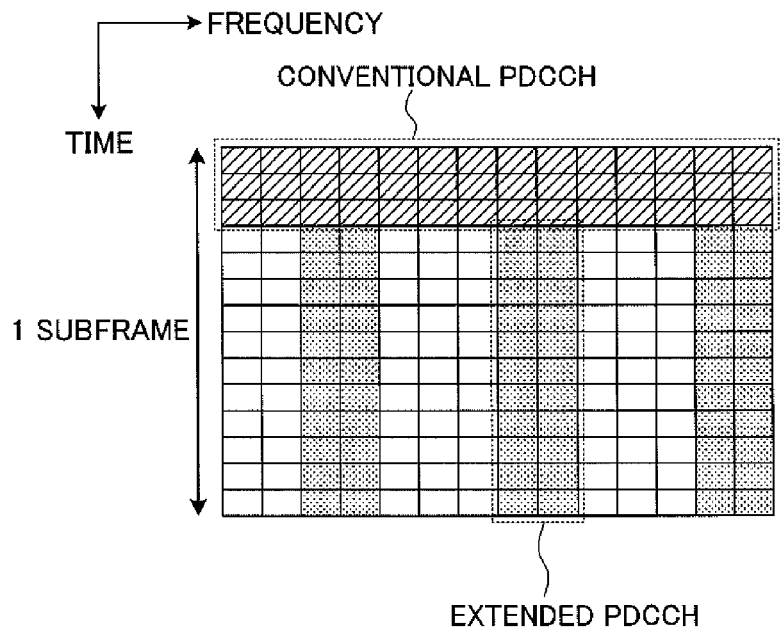
FIG. 3 provides diagrams to explain a subframe configuration of extended PDCCHs.

FIG. 3 shows an example of a frame configuration that is used when the frequency division approach is applied. In the frame configuration shown in FIG. 3A, a conventional PDCCH and extended PDCCHs are arranged. The conventional PDCCH is arranged over the entire system band, covering a predetermined number of OFDM symbols (maximum three OFDM symbols) from the top of a frame (hereinafter referred to as a "subframe"), which serves as a transmission time interval. In the radio resources following the OFDM symbols where the conventional PDCCH is arranged, extended PDCCHs are frequency-divided with PDSCHs and arranged.

Figure 3B:
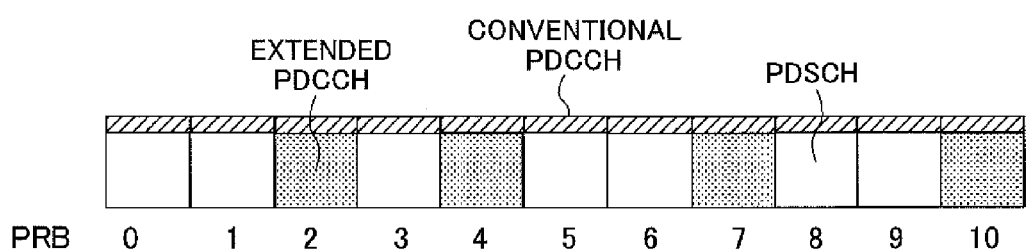

Also, as shown in FIG. 3B, the system band is formed with physical resource blocks (PRBs) (also simply referred to as "resource blocks" (RBs)). Note that, although not illustrated, the system band may be formed with resource block groups (RBGs) formed with a plurality of consecutive PRBs. In FIG. 3B, PRBs of part of the system band is allocated to extended PDCCHs, and the rest is allocated to PDSCHs. Note that the PRB is also one unit for PDSCH scheduling as well.

Figure 3C:
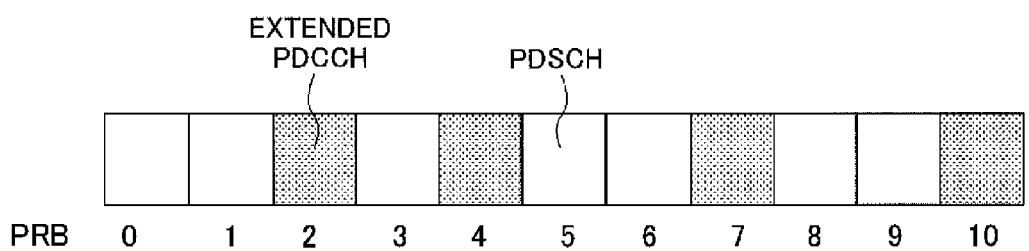

Also, as frame configurations of Rel. 11 and later versions, a carrier type (extension carrier), in which a conventional PDCCH is not arranged in a predetermined number of OFDM symbols (maximum three OFDM symbols) from the top of a subframe, is under study. In subframes of this extension carrier type, as shown in FIG. 3C, extended PDCCHs and PDSCHs may be allocated to maximum three OFDM symbols from the top. In FIG. 3C, in all the OFDM symbols constituting the subframe, PRBs of part of the system band are allocated to extended PDCCHs, and the rest is allocated to PDSCHs.

Figure 4:
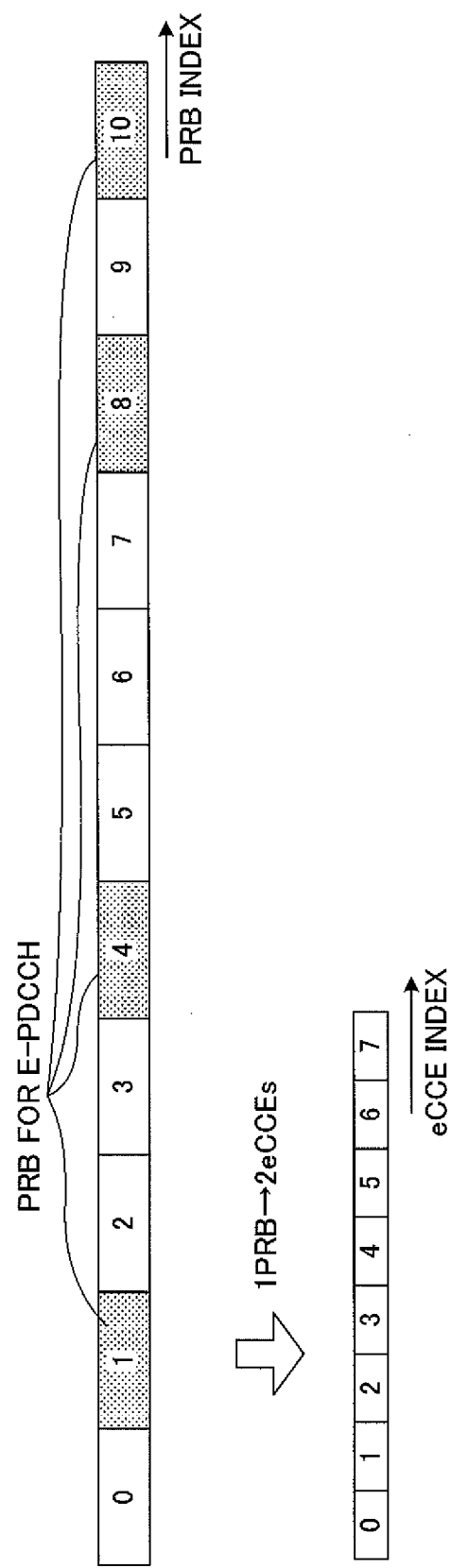
FIG. 4 is a diagram to show an example of mapping of extended PDCCHs.

In this way, when extended PDCCHs and PDSCHs are frequency-division-multiplexed, the extended PDCCHs are allocated (mapped), for example, to part of the system band, as shown in FIG. 4.

In FIG. 4, eleven physical resource blocks (PRBs) form the system band. PRB indices (PRBs #0 to #10) are assigned to the eleven PRBs along the frequency direction. In FIG. 4, the extended PDCCHs are mapped to four PRBs #1, #4, #8 and #10. Note that, although, in FIG. 4, the extended PDCCHs are mapped in PRB units, this is by no means limiting. For example, extended PDCCHs may be mapped in resource block group (RBG) units, which are formed with a plurality of consecutive PRBs (for example, two or four PRBs).

In FIG. 4, the PRBs (PRBs #1, #4, #8 and #10) where extended PDCCHs are mapped are associated with enhanced control channel elements (eCCEs). To be more specific, each PRB is associated with two eCCEs, and the eCCEs are assigned different eCCE index numbers #0 to #7.

Here, an eCCE is the unit of radio resource allocation to extended PDCCHs. An eCCE is defined such that the control channel element (CCE: Channel Control Element), which serve as the unit of radio resource allocation to the conventional PDCCH, can be re-used. Note that the existing CCEs are formed with nine resource element groups (REGs), and each REG is formed with a set of four resource elements (REs).

eCCEs #0 to #7 (FIG. 5A) that are allocated to an extended PDCCH are each divided and mapped such that the divided eCCEs are distributed into PRBs of different frequency bands. This mapping method is also referred to as "distributed mapping." FIG. 5 shows an example of distributed mapping.

To be more specific, as shown in FIG. 5A, the radio base station apparatus divides the eCCEs of eCCE index numbers #0 to #7, allocated to an extended PDCCH, into two each. In this case, four eCCEs (for example, the eCCEs of eCCE index numbers #0, #0, #1 and #1) correspond to one PRB (for example, PRB #0). Note that a PRB formed with a plurality of divided eCCEs (in FIG. 5A, four eCCEs) may be referred to as a "PRB pair." This is because a "PRB pair" is formed with two "PRBs" that are consecutive in the time direction, and, in the frequency direction, formed with the same twelve subcarriers as the "PRBs." Note that the time duration of a "PRB" is one slot, whereas the time duration of a "PRB pair" is two slots (one subframe). In the following description, for ease of explanation, eCCEs given by dividing an eCCE, which serves as the unit of allocation of extended PDCCHs, into a plurality of portions, may also be referred to simply as "eCCEs." Note that eCCEs where extended PDCCHs are divided into a plurality of portions may be referred to as "divided eCCEs," "extended resource element group (eREG)," and so on.

Next, as shown in FIG. 5B, the eCCEs divided in FIG. 5A are distributed and arranged in a plurality of virtual resource regions. In FIG. 5B, four virtual resource blocks (VPRBs) #1 to #4 are defined as virtual resource regions, and the sixteen eCCEs shown in FIG. 5A are arranged in VPRBs #1 to #4 in a distributed manner.

To be more specific, eCCEs assigned the same eCCE index numbers in FIG. 5A are arranged in VPRBs of different index numbers in FIG. 5B. For example, the two eCCEs assigned the same eCCE index number #0 are arranged in VPRB #1 and VPRB #2. Similarly, the two eCCEs assigned the same eCCE index number #1 are arranged in VPRB #3 and VPRB #4. The same holds with the two eCCEs assigned eCCE index numbers #2 to #7.

As shown in FIG. 5C, a plurality of virtual resource regions (VPRBs #1 to #4), where eCCEs are arranged in a distributed manner, are interleaved, and mapped to original PRBs #1, #4,

8 and #10. In FIG. 5C, VPRB #1 is mapped to original PRB #1, VPRB #2 is mapped to original PRB #8, VPRB #3 is mapped to original PRB #4, and VPRB #4 is mapped to original PRB #10.

As shown in FIG. 5C, by interleaving VPRBs and mapping these back to the original PRBs, it is possible to expand the frequency intervals between eCCE pairs assigned the same eCCE index numbers, so that it is possible to achieve a frequency diversity effect of extended PDCCHs.

Note that, although not illustrated, the eCCEs divided in FIG. 5A may be locally mapped to PRBs of the same frequency band. In this case, the two eCCEs assigned eCCE index number #0 and the two eCCEs assigned eCCE index number #1 are arranged in PRB #1. The same holds with the two eCCEs assigned eCCE index numbers #2 to #7. This mapping method is also referred to as localized mapping.

Now, according to the method "without cross interleaving," DM-RSs are arranged in each PRB such that a user terminal UE is able to perform channel estimation in PRB units. Also, in MU-MIMO transmission, maximum eight transmission layers are supported, and DM-RSs are provided on a per transmission layer basis. The DM-RS of each transmission layer is orthogonalized using one or both of code division multiplexing (CDM) by an orthogonal code and frequency division multiplexing (FDM). For example, when the number of transmission layers is two, CDM to use an orthogonal code of a code length of two is applied to the DM-RS of each transmission layer. Also, when the number of transmission layers is three or four, CDM and FDM to use an orthogonal code of a code length of two is applied to the DM-RS of each transmission layer. Also, when the number of transmission layers is five to eight, CDM and FDM to use an orthogonal code of a code length of four is applied to the DM-RS of each transmission layer.

Also, the DM-RS of each transmission layer is multiplied by user terminal UE-specific weights (which may also be referred to as "precoding weights," "transmission weights," "beam forming weights" and so on) and transmitted. Consequently, in MU-MIMO transmission, DM-RSs are arranged in each PRB so as to match with a plurality of transmission layers.

Figure 6:
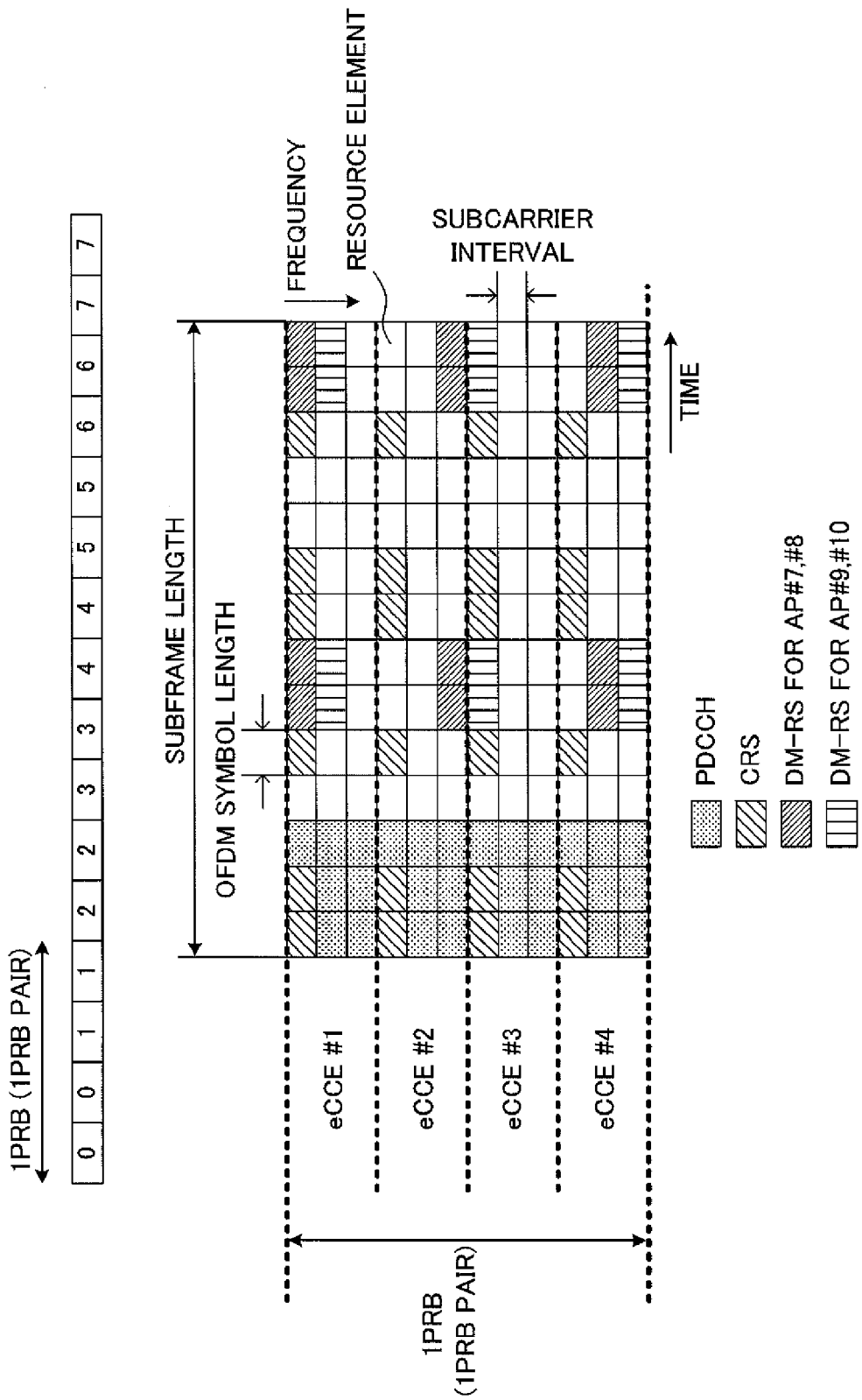
FIG. 6 is a diagram to show an example of a subframe configuration where eCCEs are frequency-division-multiplexed in a PRB.

FIG. 6 shows, an arrangement of DM-RSs in the event the number of transmission layers is four. Note that antenna ports are assigned in advance to each transmission layer. When the number of transmission layers is four, antenna ports #7 to #10 are assigned to transmission layers #0 to #3, respectively.

As shown in FIG. 6, when the number of transmission layers is four, the DM-RSs of antenna ports (APs) #7 and #8 are code-division-multiplexed over two resource elements (REs) that are consecutive in the time direction. Similarly, the DM-RSs of antenna ports (APs) #9 and #10 are code-division-multiplexed over two REs that are consecutive in the time direction. Note that, in code-division-multiplexing, an orthogonal code of a code length of two is used. The DM-RSs of APs #7 and #8 and APs #9 and #10 are frequency-division-multiplexed between neighboring sub carriers.

Now, allocation of extended PDCCHs in eCCE units, which are given by dividing PRBs, not in PRB units, is under study. Also, as has been described with FIG. 5, dividing one eCCE further into a plurality of portions and distributing and mapping the divided eCCEs to different PRBs is also under study. Consequently, referring to FIG. 6, it may occur that extended PDCCHs for different user terminal UEs are mapped to the eCCEs (eCCEs #1 to #4) constituting one PRB. In this case, the DM-RSs of APs #7 to #10 are multiplied by mutually different beam forming weights (weights). Consequently, when executing beam forming, for example, it is necessary to make user terminal UEs having extended PDCCHs mapped to the eCCEs constituting one PRB recognize which antenna ports' DM-RSs the user terminal UEs should use to demodulate these extended PDCCHs. As this method, a first method to associate eCCEs #1 to #4 and APs #7 to #9 of the DM-RSs, and a second method to report which antenna ports' DM-RSs should be used to the user terminal UEs through higher layer signaling, may be possible.

Note that, in FIG. 6 to FIG. 10, the eCCEs to constitute one PRB are referred to as eCCEs #1 to #4, to make distinction between each eCCE. However, note that these eCCEs #1 to #4 simply represent the indices of the first to fourth extended downlink control channel resources in a PRB, and are different from the eCCE indices that are used in the allocation of downlink control information described with FIG. 5. Also, although the eCCEs of FIG. 6 to FIG. 10 are equivalent to the divided eCCEs shown in FIG. 5A, this is by no means limiting.

Figure 7:
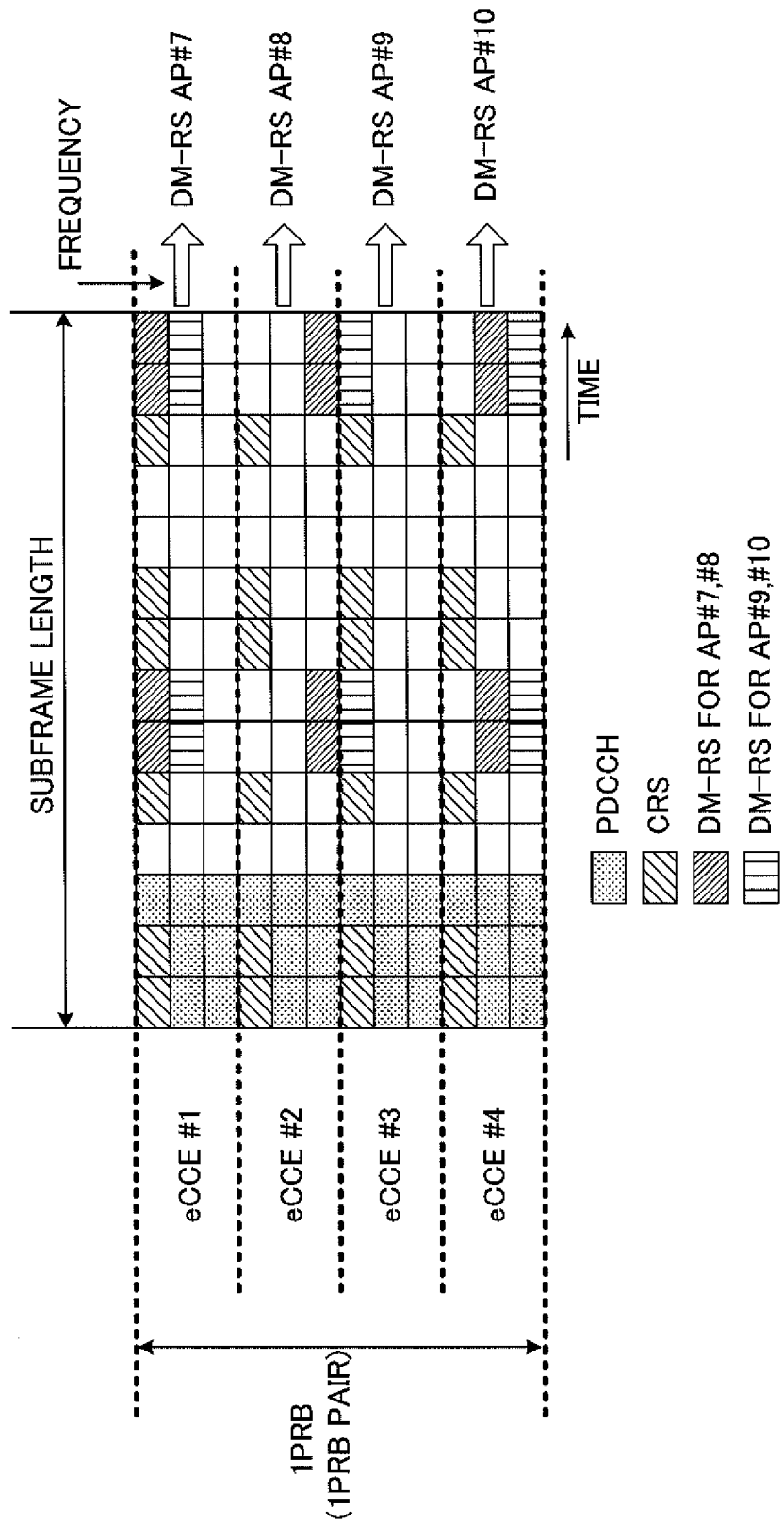
FIG. 7 is a diagram to show an example of association of eCCEs and DM-RS antenna ports.

With the first method, as shown in FIG. 7, DM-RS antenna ports (APs) #7 to #10 are associated with eCCEs #1 to #4 constituting one PRB, respectively. In this case, a user terminal UE performs channel estimation using the DM-RSs of APs #7 to #10, and acquires the channel estimation values of APs #7 to #10. In FIG. 7, eCCE #1 and DM-RS AP #7 are associated with each other, so that the user terminal UE demodulates the extended PDCCH mapped to eCCE #1 using the channel estimation value of AP #7. Likewise, in FIG. 7, eCCEs #2 to #4 and DM-RS APs #8 to #10 are associated with each other, so that the user terminal UE demodulates the extended PDCCHs mapped to eCCEs #2 to #4 using the channel estimation values of APs #8 to #10, respectively.

In this way, according to the first method, eCCEs #1 to #4 constituting a PRB and DM-RS APs #7 to #10 are associated with each other. Consequently, with the first method, a radio base station apparatus does not have to report the DM-RS antenna ports to use to demodulate the extended PDCCHs mapped to eCCEs #1 to #4 to the user terminal UE, and yet the user terminal UE is able to demodulate extended PDCCHs using channel estimation values (that is, beam forming weight that is dedicated to the user terminal) of adequate antenna ports. As a result of this, the user terminal UE is able to achieve beam forming gain with respect to extended PDCCHs.

Figure 8:
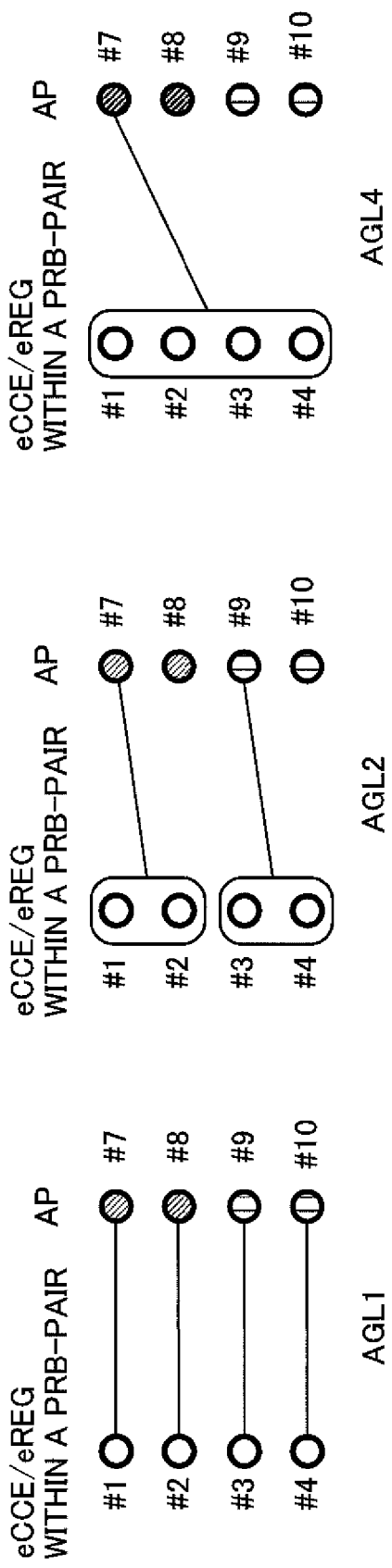
FIG. 8 provides diagrams to show an example of association of eCCEs and DM-RS antenna ports per aggregation level.

FIG. 8 shows association of eCCEs and DM-RS antenna ports per aggregation level according to the first method. In FIG. 8, eCCEs #1 to #4 constituting one PRB and antenna ports (APs) #7 to #9 in the event the number of transmission layers is four are associated with each other on a per aggregation level basis.

Here, the aggregation level (AGL) represents how many consecutive eCCEs are allocated to an extended PDCCH for a user terminal UE. For example, at AGL 1, one eCCE is allocated to an extended PDCCH for a user terminal UE. Similarly, at AGL 2, two consecutive eCCEs are allocated, and, at AGL 4, four consecutive eCCEs are allocated. The aggregation level is determined based on the received quality of signals at the user terminal UE. Also, based on the aggregation level, search spaces, which represent the ranges in which the user terminal UE performs blind decoding, are defined.

At AGL 1, extended PDCCHs are allocated in one-eCCE units, so that one DM-RS antenna port (AP) is associated with one eCCE. For example, in FIG. 8A, eCCEs #1 to #4 to constitute the PRB are associated with APs #7 to #10, respectively.

At AGL 2, extended PDCCHs are allocated in two-eCCE units, so that one DM-RS antenna port (AP) is associated with two consecutive eCCEs. For example, in FIG. 8B, eCCEs #1 and #2 are associated with AP #7, and eCCEs #3 and #4 are associated with AP #9.

At AGL 4, extended PDCCHs are allocated in four-eCCE units, so that one DM-RS antenna port (AP) is associated with four consecutive eCCEs. For example, in FIG. 8C, eCCEs #1 to #4 are associated with AP #7.

Note that, in the first method, the predetermined resource regions to be associated with the DM-RS antenna ports (APs) are not limited to enhanced control channel elements (eCCEs) to be frequency-division-multiplexed in resource blocks. For example, the predetermined resource regions may be extended resource element groups (eREGs). Here, the extended resource element groups (eREGs) are divided eCCEs that are given by dividing eCCEs into a plurality of portions, and, by mapping these in pairs with a plurality of PRBs, it is possible to achieve a frequency diversity effect even when the aggregation level is low.

On the other hand, with the second method, a DM-RS antenna port (AP) to use to demodulate an extended PDCCH for a user terminal UE is reported to the user terminal UE through higher layer signaling. In this case, the user terminal UE performs channel estimation using the DM-RS of the antenna port reported through higher layer signaling, and acquires the channel estimation value of the antenna port. The user terminal UE demodulates the extended PDCCH mapped to eCCEs using the acquired channel estimation value.

With the second method, channel estimation has only to be performed with respect to one antenna port reported through higher layer signaling, so that, unlike the first method, it is not necessary to perform channel estimation for a plurality of antenna ports c the number of transmission layers. Consequently, with the second method, it is possible to simplify the process related to channel estimation.

Figure 9:
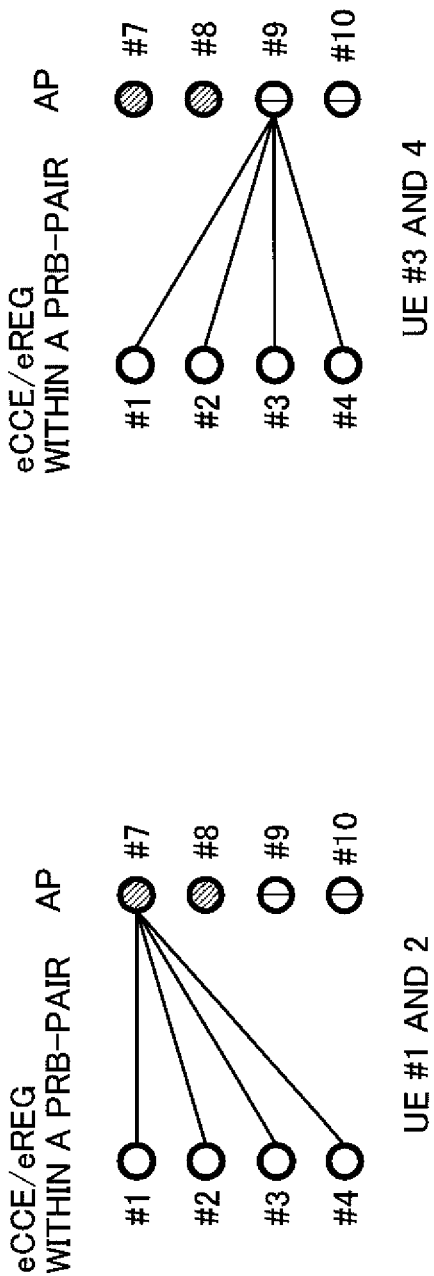
FIG. 9 provides diagrams to show another example of association of eCCEs and DM-RS antenna ports.

FIG. 9 shows the association between eCCEs and DM-RS antenna ports (APs) according to the second method. For example, assume that, in FIG. 9A, an extended PDCCH for user terminal UE #1 is mapped to eCCEs #1 and #2, and an extended PDCCH for user terminal UE #2 is mapped to eCCEs #3 and #4. In this case, when DM-RS AP #7 is reported to both of user terminal UEs #1 and #2 through higher layer signaling, blocking is produced between user terminal UEs #1 and #2.

When, as shown in FIG. 9A, a plurality of user terminal UEs #1 and #2 are assigned to the same AP #7, it is not clear by which of the beam forming weights of user terminal UEs #1 and #2 the DM-RS of AP #7 should be multiplied. Consequently, even if user terminal UEs #1 and #2 demodulate the extended PDCCHs mapped to eCCEs #1 to #4 using the channel estimation value of the DM-RS of AP #7, beam forming gain may not be achieved with respect to these extended PDCCHs. This phenomenon is referred to as "blocking."

Likewise, in FIG. 9B, since DM-RS AP #9 is reported to both of user terminal UEs #3 and #4 through higher layer signaling, blocking is produced between user terminal UEs #3 and #4.

As described above, although, with the first method (see FIG. 7 and FIG. 8), it becomes unnecessary to report antenna ports to user terminal UEs through higher layer signaling, channel estimation needs to be performed with respect to a plurality of antenna ports to match the number of transmission layers (for example, four antenna ports #7 to #9 when the number of transmission layers is four), and therefore the process pertaining to channel estimation becomes complex. By contrast with this, with the second method (see FIG. 9), channel estimation has only to be performed with respect to one antenna port reported through higher layer signaling, and, although the process pertaining to channel estimation can be simplified, blocking is produced between user terminal UEs allocated the same antenna port.

So, the present inventors have studied a method of configuring DM-RS antenna ports which can simplify the process pertaining to channel estimation in user terminal UEs and which furthermore can reduce the occurrence of blocking between user terminals where the same DM-RS antenna port is assigned, and arrived at the present invention.

Now, an example of a method of configuring a DM-RS (demodulation reference signal) for demodulating an extended PDCCH according to the present embodiment will be described. With the present embodiment, a plurality of antenna ports corresponding to the number of transmission layers of DM-RSs are grouped into a plurality of groups. To be more specific, different antenna ports are selected from a plurality of antenna ports to match the number of transmission layers, and form a plurality of groups. Also, in each group, the resource regions (for example, enhanced control channel elements (eCCEs), extended resource element groups (eREGs) and so on) in a PRB and the antenna ports to constitute the group are associated with each other.

Figure 10:
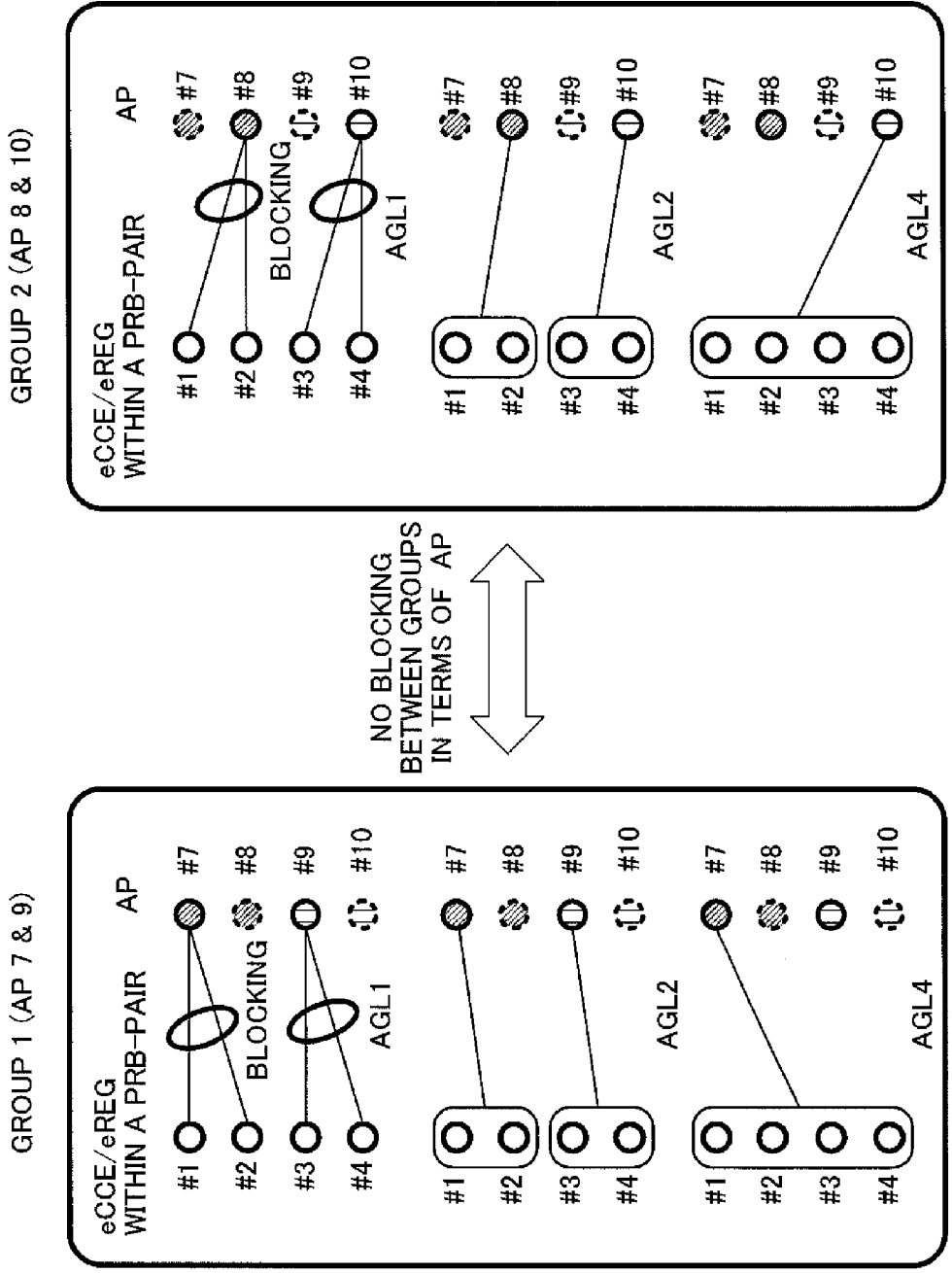
FIG. 10 is a diagram to show an example of association of eCCEs and DM-RS antenna ports according to an embodiment.

FIG. 10 is a diagram to show an example of a method of configuring DM-RSs according to the present embodiment. Note that, although a case will be described with FIG. 10 where the number of transmission layers is four, this is by no means limiting.

When the number of transmission layers is four, antenna ports (APs) #7 to #10 are allocated to the DM-RSs of layers #0 to #3. Here, assume that the DM-RSs of APs #7 to #9 are orthogonalized with respect to each other by code division multiplexing (CDM) or by frequency division multiplexing (FDM). To be more specific, as has been described with FIG. 6, the DM-RSs of APs #7 and #8 are code-division-multiplexed (CDM), and the DM-RSs of APs #9 and #10 are code-division-multiplexed (CDM). Also, the DM-RSs of APs #7 and #8 and the DM-RSs of APs #9 and #10 are frequency-division-multiplexed (FDM).

In FIG. 10, DM-RS antenna ports (APs) #7 to #10 are grouped into groups formed with antenna ports of DM-RSs that are frequency-division-multiplexed (FDM). To be more specific, group 1 of FIG. 10 is formed with APs #7 and #9 where the DM-RSs are frequency-division-multiplexed, and group 2 is formed with APs #8 and #10 where the DM-RSs are frequency-division-multiplexed.

In group 1, antenna ports (APs) #7 and #9 belonging to group 1 and eCCEs #1 to #4 constituting the PRB are associated with each other on a per aggregation level (AGL) basis. Note that eCCEs #1 to #4 indicate the first to fourth eCCEs in the PRB.

To be more specific, at AGL 1 of group 1, eCCE #1 and eCCE #2 are both associated with AP #7. Likewise, eCCE #3 and eCCE #4 are both associated with AP #9. At AGL 1, the extended PDCCH for each user terminal UE is allocated in one-eCCE units. Consequently, in AP #7, blocking is produced between the two user terminal UEs allocated to eCCEs #1 and #2, respectively. Likewise, in AP #9, blocking is produced between the two user terminal UEs allocated to eCCEs #3 and #4, respectively.

Also, at AGL 2 of group 1, two eCCEs #1 and #2 are associated with AP #7. Likewise, two eCCEs #3 and #4 are associated with AP #9. At AGL 2, allocation to the extended PDCCH for each user terminal UE is carried out in two-eCCE units. Consequently, an extended PDCCH for one user terminal UE is allocated to eCCEs #1 and #2, and the blocking between the user terminal UEs in AP #7 is prevented. The same holds with AP #9.

Also, at AGL 4 of group 1, four eCCEs #1 to #4 are associated with AP #7. At AGL 4, allocation to the extended PDCCH for each user terminal UE is carried out in four-eCCE units. Consequently, an extended PDCCH for one user terminal UE is allocated to eCCEs #1 to #4, and the blocking between the user terminal UEs in antenna port #7 is prevented.

Similarly, in group 2, antenna ports (APs) #8 and #10 belonging to group 2 and a plurality of eCCEs #1 to #4 constituting the PRB are associated with each other on a per aggregation level (AGL) basis. Note that the details of association of eCCEs #1 to #4 and APs #8 and #10 at AGL 1, AGL 2 and AGL 4 of group 2 in FIG. 10 are the same as with group 1, and will not be described here.

Note that the association between the antenna ports belonging to each group and the eCCEs in the PRB are by no means limited to the one shown in FIG. 10. For example, at AGL 2 of group 1, eCCEs #1 and #2 may be associated with AP #9.

Also, in FIG. 10, grouping of DM-RS antenna ports #7 to #10 is by no means limited to the one shown in FIG. 10. Any grouping may be possible unless the same antenna port belongs to varying groups in an overlapping manner. For example, group 1 of FIG. 10 may be formed with antenna ports #7 and #10 where the DM-RSs are frequency-division-multiplexed (FDM), and group 2 may be formed with antenna ports #8 and #9 where the DM-RSs are frequency-division-multiplexed (FDM).

Also, in FIG. 10, although each group is formed with a plurality of antenna ports where the DM-RSs are orthogonalized by frequency division multiplexing (FDM), this is by no means limiting, and each group may be formed with a plurality of antenna ports where the DM-RSs are orthogonalized by code division multiplexing (CDM). In this case, group 1 may be formed with antenna ports #7 and #8 where the DM-RSs are code-division-multiplexed (CDM), and group 2 may be formed with antenna ports #9 and #10 where the DM-RSs are code-division-multiplexed (CDM).

Next, the demodulation operation of extended PDCCHs according to the present embodiment will be described. With the present embodiment, a radio base station apparatus reports one group, out of a plurality of groups, into which a plurality of antenna ports to match the number of DM-RS (demodulation reference signal) transmission layers are grouped, to a user terminal UE. This reporting may be made using higher layer signaling such as RRC signaling. The user terminal UE acquires group information that represents the one group reported from the radio base station apparatus, and performs channel estimation using the DM-RSs corresponding to each antenna port belonging to that one group (to be more specific, estimate the weights by which the DM-RSs are multiplied). Using the weight estimation values of the antenna ports in the above one group that are associated with the resource regions allocated to an extended PDCCH, the user terminal UE demodulates the extended PDCCH.

For example, referring to FIG. 10, consider a case where the radio base station apparatus reports group 1 to a user terminal UE through higher layer signaling. In this case, the user terminal UE performs channel estimation using the DM-RSs of antenna ports (APs) #7 and #9 belonging to group 1 reported from the radio base station apparatus, and acquires channel information that is multiplied by the estimation values of the weights by which the DM-RSs of AP #7 and #9 are multiplied. Also, the user terminal UE performs blind decoding based on search spaces and aggregation level (AGL) given through higher layer signaling, and finds out the eCCEs where the extended PDCCH for that user terminal is mapped. For example, at AGL 2, when an extended PDCCH for the user terminal is mapped to eCCEs #1 and #2, the user terminal UE demodulates the extended PDCCH using the weight estimation value and channel estimation value of AP #7 associated with eCCEs #1 and #2 (that is, using beam forming weight that is dedicated to the user terminal). As a result of this, the user terminal UE is able to achieve beam forming gain with respect to the extended PDCCH.

In this way, according to the present embodiment, a radio base station apparatus reports the group (for example, group 1) that is allocated to the user terminal UE. Consequently, the user terminal UE has only to perform channel estimation using the DM-RSs of APs #7 and #9 belonging to group 1 reported from the radio base station apparatus, so that, compared to the case of performing channel estimation using the DM-RSs of all of APs #7 to #10, it is possible to simplify the process pertaining to channel estimation in the user terminal UE. Also, as shown in FIG. 10, a plurality of user terminal UEs are not allocated to the same antenna port except when the aggregation level (AGL) is 1, so that it is possible to reduce the occurrence of blocking between user terminal UEs.

As described above, with the present embodiment, it is possible to simplify the process pertaining to channel estimation in user terminal UEs, and furthermore reduce the occurrence of blocking between user terminals where the same DM-RS antenna port is allocated.

Note that, although the present embodiment has been described such that a radio base station apparatus reports one group, among a plurality of groups into which a plurality of antenna ports are grouped, to a user terminal UE, this is by no means limiting. For example, it is equally possible to report the antenna ports belonging to that one group.

Also, although a case has been described with the present embodiment where extended PDCCH resource regions (extended downlink control channel resource region) in a PRB are eCCEs, these extended PDCCH resource regions may be eREGs, which are formed by dividing eCCEs. Also, although a case has been described where four eCCEs are frequency-division-multiplexed in a PRB, this is by no means limiting. For example, even when three or fewer or five or more eCCEs are frequency-division-multiplexed in a PRB, it is equally possible to use the method that is used when four eCCEs are frequency-division-multiplexed in a PRB, as appropriate.

Also, although a case has been described with the present embodiment where a plurality of extended PDCCH resource regions (eCCEs or eREGs) are frequency-division multiplexed in a PRB, this is by no means limiting. For example, even when time division multiplexing, space multiplexing and code multiplexing are applied, or when frequency division multiplexing, time division multiplexing, space multiplexing and code multiplexing are applied in combination, it is still possible to use the method that is used with frequency division multiplexing as appropriate.

Also, although a case has been described with the present embodiment where the number of transmission layers is four (that is, a case where four DM-RS antenna ports are used), this is by no means limiting. For example, when the number of transmission layers is three or less or five or more (that is, a case where three or fewer or five or more DM-RS antenna ports are used), it is still possible to use the method that is used when the number of transmission layers is four, as appropriate.

Also, although a case has been described with the present embodiment where a plurality of extended PDCCH resource regions (eCCEs or eREGs) are multiplexed in a PRB (resource block), this is by no means limiting. For example, a plurality of extended PDCCH resource regions may be multiplexed, in a PRB pair (resource block pair) formed with two PRBs that are consecutive in the time direction, by frequency division multiplexing, time division multiplexing, code multiplexing, space multiplexing, or combination of these. In this case, the extended PDCCH resource regions in the PRB pair and the antenna ports to constitute each group are associated with each other.

Here, the time duration of a PRB pair is 1 ms (=0.5 ms×2), and the two PRBs in the PRB pair correspond to the first-half slot and the second-half slot in a subframe. In this case, it is possible to time-divide the subframe into the first-half slot and the second-half slot, and frequency-division-multiplex a plurality of extended PDCCH resource regions in each of the first-half slot and the second-half slot. When four extended PDCCH resource regions are frequency-division-multiplexed in each of the first-half slot and the second-half slot, eight (2×4) extended PDCCH resource regions are included in a PRB pair, so that DM-RSs of eight-layer configuration may be used. In this case, it is possible to divide eight antenna ports into groups of four, and associate the eight extended PDCCH resource regions in the PRB pair and the four antenna ports constituting each group with each other.

Also, with the present embodiment, a plurality of eCCEs to constitute a PRB may be applied distributed mapping as has been described using FIG. 4 and FIG. 5, or may be applied localized mapping. In distributed mapping, extended PDCCHs are distributed and mapped to the system band, so that a frequency diversity effect can be expected. On the other hand, in localized mapping, a frequency scheduling effect can be expected in accordance with the communication environment and so on.

(Configuration of Radio Communication System)

Figure 11:
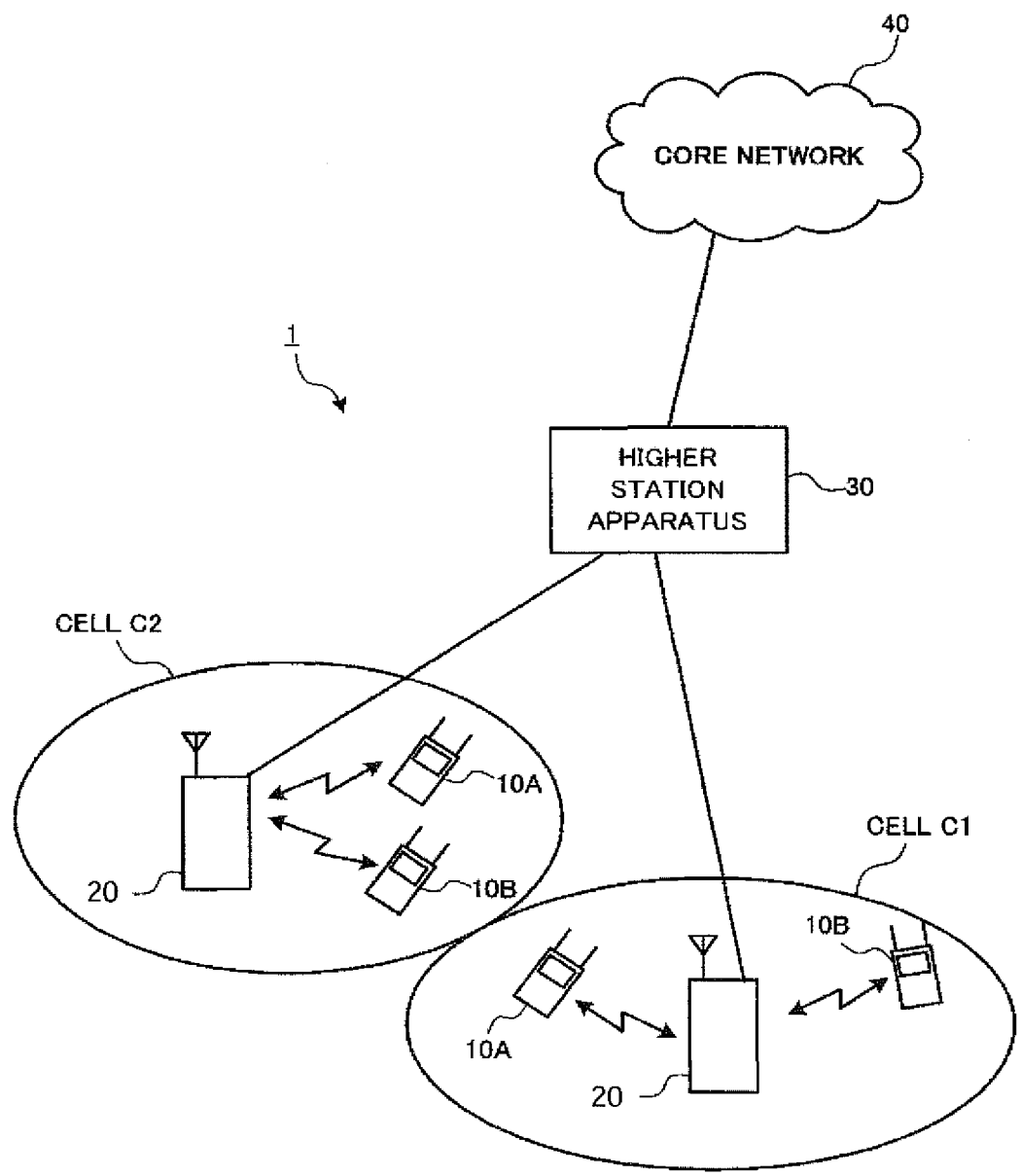
FIG. 11 is a diagram to explain a system configuration of a radio communication system according to an embodiment.

Now, a radio communication system according to the present embodiment will be described in detail. FIG. 11 is a diagram to explain a system configuration of the radio communication system according to the present embodiment. Note that the radio communication system shown in FIG. 11 is a system to accommodate, for example, an LTE system or its successor system. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 11, a radio communication system 1 is configured to include radio base station apparatuses 20 and a plurality of user terminals 10 that communicate with the radio base station apparatuses 20. The radio base station apparatuses 20 are connected with a higher station apparatus 30, and this higher station apparatus 30 is connected with a core network 40. Also, the radio base station apparatuses 20 are connected with each other by wire connection or by wireless connection. The user terminals 10 (10A and 10B) are able to communicate with the radio base station apparatuses 20 in cells C1 and C2. Note that the higher station apparatus 30 may be, for example, an access gateway apparatus, a radio network controller (RNC), a mobility management entity (MME) and so on, but is by no means limited to these.

Although the user terminals 10 may be either LTE terminals or LTE-A terminals, the following description will be given simply with respect to user terminals, unless specified otherwise.

In the radio communication system 1, for radio access schemes, OFDMA (Orthogonal Frequency Division Multiple Access) is applied to the downlink, and SC-FDMA (Single-Carrier Frequency Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared Channel), which is used by each user terminal 10 on a shared basis as a downlink data channel, downlink L1/L2 control channels (PDCCH, PCFICH, PHICH), and extended PDCCHs, which are extensions of the PDCCH. User data and higher control information are transmitted by the PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

PDSCH and PUSCH scheduling information and so on are transmitted by means of the extended PDCCH. The extended PDCCH is used to support the shortage of PDCCH capacity using the resource regions where the PDSCH is allocated.

Uplink communication channels include a PUSCH (Physical Uplink Shared Channel), which is used by each user terminal on a shared basis as an uplink data channel, and a PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH.

Figure 12:
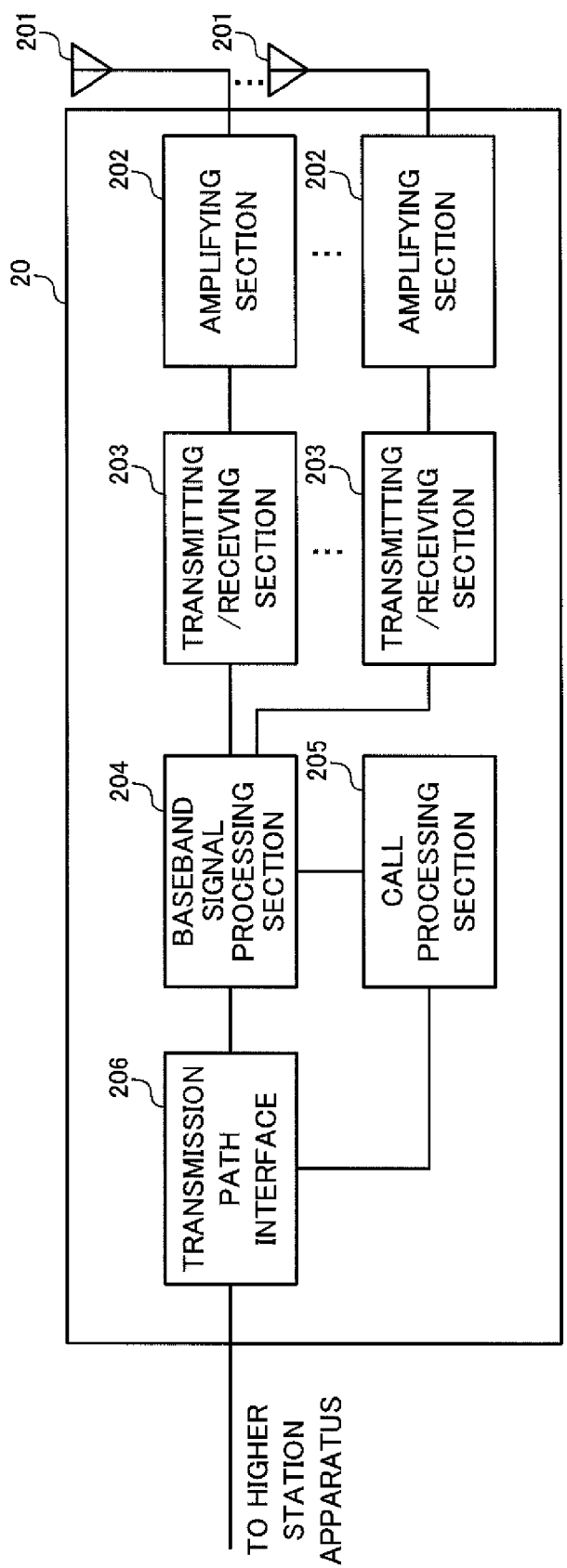
FIG. 12 is a diagram to explain an overall configuration of a radio base station apparatus according to an embodiment.

An overall configuration of the radio base station apparatus according to the present embodiment will be described with reference to FIG. 12. The radio base station apparatus 20 has a plurality of transmitting/receiving antennas 201 for MIMO transmission, amplifying sections 202, transmitting/receiving (transmitting) sections 203, a baseband signal processing section 204, a call processing section 205, and a transmission path interface 206.

User data to be transmitted from the radio base station apparatus 20 to the user terminal 10 on the downlink is input from the higher station apparatus 30 into the baseband signal processing section 204 via the transmission path interface 206.

In the baseband signal processing section 204, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process are performed, and the results are transferred to each transmitting/receiving section 203. Furthermore, signals of a downlink control channel are also subjected to transmission processes such as channel coding and an inverse fast Fourier transform, and are transferred to each transmitting/receiving section 203.

Also, the baseband signal processing section 204 reports, to the user terminals 10, control information for allowing communication in that cell, through a broadcast channel. The information for allowing communication in the cell includes, for example, the uplink or downlink system bandwidth, resource block information allocated to the user terminals 10, precoding information for precoding in the user terminals 10, root sequence identification information (root sequence index) for generating random access preamble signals in the PRACH (Physical Random Access Channel), and so on. The precoding information may be transmitted via an independent control channel such as the PHICH.

The transmitting/receiving sections 203 convert the baseband signals, which have been subjected to precoding and output from the baseband signal processing section 204 on a per antenna basis, into a radio frequency band. The amplifying sections 202 amplify the radio frequency signals subjected to frequency conversion, and output the results through the transmitting/receiving antennas 201.

Meanwhile, as for data to be transmitted from the user terminal 10 to the radio base station apparatus 20 on the uplink, radio frequency signals received by the transmitting/receiving antennas 201 are amplified in the amplifying sections 202, converted into baseband signals through frequency conversion in the transmitting/receiving sections 203, and input in the baseband signal processing section 204.

The baseband signal processing section 204 applies, to the user data included in the baseband signals received as input, an FFT process, an IDFT process, error correction decoding, a MAC retransmission control receiving process, and RLC layer and PDCP layer receiving processes, and transfers the result to the higher station apparatus 30 via the transmission path interface 206.

The call processing section 205 performs call processing such as setting up and releasing communication channels, manages the state of the radio base station apparatus 20 and manages the radio resources.

Figure 13:
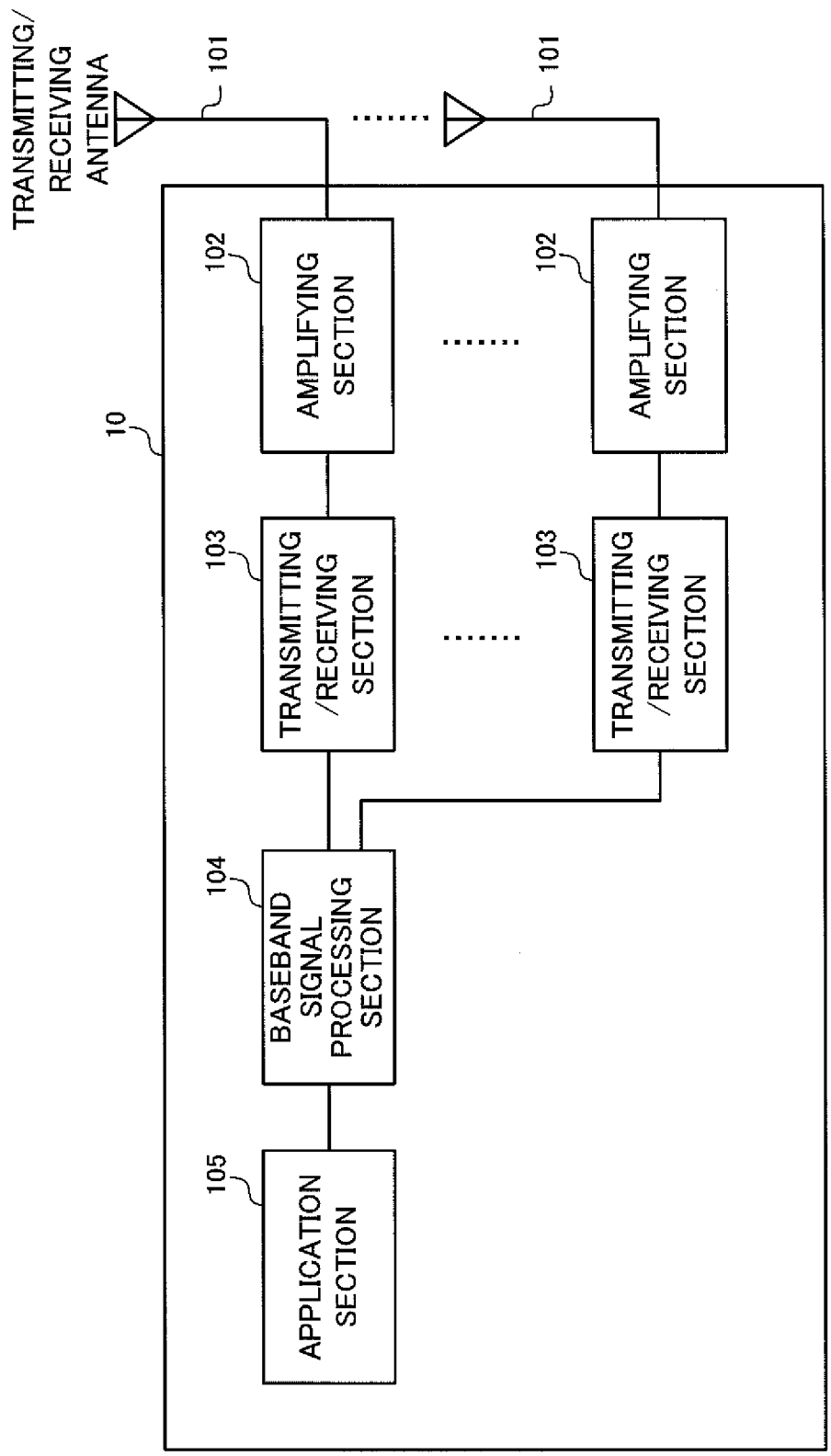
FIG. 13 is a diagram to explain an overall configuration of a user terminal according to an embodiment.

Next, an overall configuration of a user terminal according to the present embodiment will be described with reference to FIG. 13. An LTE terminal and an LTE-A terminal have the same hardware configurations in principle parts, and therefore will be described indiscriminately. The user terminal 10 has a plurality of transmitting/receiving antennas 101 for MIMO transmission, amplifying sections 102, transmitting/receiving sections (receiving sections) 103, a baseband signal processing section 104, and an application section 105.

As for downlink data, radio frequency signals that are received in a plurality of transmitting/receiving antennas 101 are each amplified in the amplifying sections 102, and subjected to frequency conversion and converted into baseband signals in the transmitting/receiving sections 103. The baseband signals are subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

Meanwhile, uplink user data is input from the application section 105 to the baseband signal processing section 104. The baseband signal processing section 104 performs a retransmission control (H-ARQ (Hybrid ARQ)) transmission process, channel coding, precoding, a DFT process, an IFFT process, and so on, and transfers the results to each transmitting/receiving section 103. The baseband signals that are output from the baseband signal processing section 104 are converted into a radio frequency band in the transmitting/receiving sections 103. After that, the amplifying sections 102 amplify the radio frequency signals having been subjected to frequency conversion, and transmit the results from the transmitting/receiving antennas 101.

Figure 14:
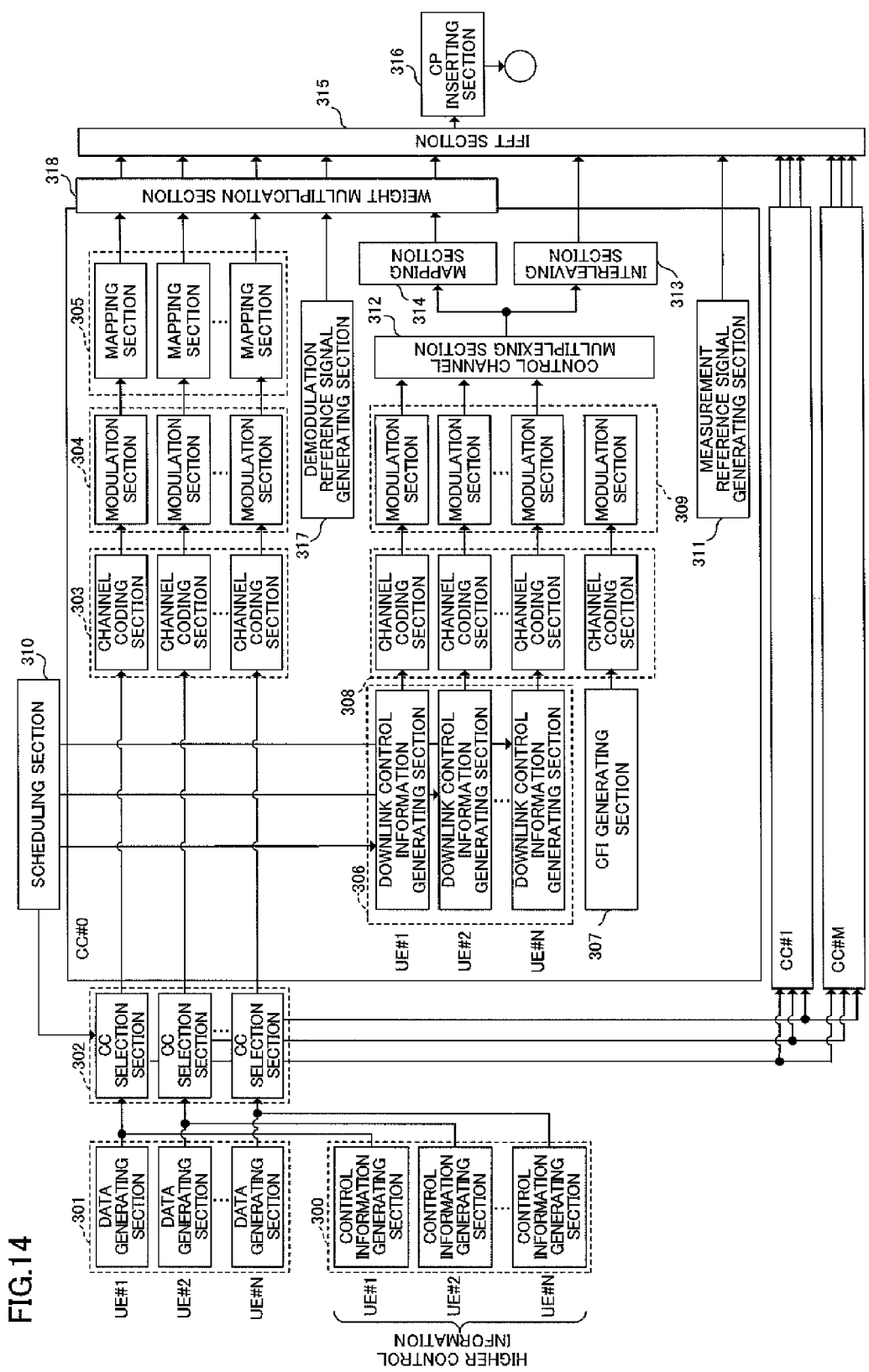
FIG. 14 is a functional block diagram to show a baseband processing section provided in a radio base station apparatus according to an embodiment, and part of higher layers.

FIG. 14 is a functional block diagram of a baseband signal processing section 204 provided in the radio base station apparatus 20 according to the present embodiment and part of the higher layers, and the baseband signal processing section 204 primarily shows the function blocks of a transmission processing section. FIG. 14 shows an example of a base station configuration which can support the maximum number of M+1 component carriers (CC #0 to CC #M). Transmission data for user terminals 10 under the radio base station apparatus 20 is transferred from the higher station apparatus 30 to the radio base station apparatus 20. Note that, although FIG. 14 primarily shows a functional configuration for downlink communication, the radio base station apparatus 20 may also have a functional configuration for uplink communication.

Control information generating sections 300 generate higher control information to send through higher layer signaling (for example, RRC signaling), on a per user basis. Also, the higher control information may include the resource blocks (PRB positions) where an enhanced PDCCH (FDM-type PDCCH) can be mapped in advance. Also, the higher control information may include group information that represents the group allocated to the user terminal 10. As described earlier, the group information is information that represents one group, among a plurality of groups, into which a plurality of antenna ports to match the number of the DM-RS (demodulation reference signal) transmission layers are grouped.

Data generating sections 301 output transmission data transferred from the higher station apparatus 30 as user data on a per user basis. Component carrier selection sections 302 select the component carriers to be allocated for radio communication with the user terminal 10, on a per user basis.

A scheduling section 310 controls the resource allocation in each component carrier. The scheduling section 310 receives as input transmission data and retransmission commands from the higher station apparatus 30, and also receives as input channel estimation values and resource block CQIs from the receiving section having measured an uplink received signal.

Also, the scheduling section 310 schedules downlink control information for each user terminal 10 with reference to the retransmission commands that are received as input from the higher station apparatus 30, channel estimation values and CQIs. A propagation path in mobile communication varies differently per frequency, due to frequency selective fading. So, upon transmission of data, resource blocks of good communication quality are allocated to the user terminal 10, on a per subframe basis (which is referred to as "adaptive frequency scheduling"). In adaptive frequency scheduling, a user terminal 10 of good propagation path quality is selected for each resource block and assigned. Consequently, the scheduling section 310 allocates resource blocks, with which improvement of throughput is anticipated, using the CQI of each resource block, fed back from each user terminal 10.

Also, the scheduling section 310 determines whether to transmit the downlink control information in the allocation region of the conventional PDCCH or frequency-division-multiplex and transmit the downlink control information with the PDSCH. Also, the scheduling section 310 designates resource blocks (mapping positions) of good communication quality on a per subframe basis, by adaptive frequency scheduling, with respect to the downlink control information to be transmitted in the PDSCH region. Consequently, the scheduling section 310 designates the resource blocks (mapping positions) using the CQI of each resource block fed back from each user terminal 10.

Also, the scheduling section 310 controls the number of CCE aggregations in accordance with the conditions of the propagation path with the user terminal 10. The number of CCE aggregations is increased with respect to cell edge users. Also, the MCS (coding rate and modulation scheme) that fulfills a predetermined block error rate with the allocated resource blocks is determined. Parameters to fulfill the MCS (coding rate and modulation scheme) determined in the scheduling section 310 are set in channel coding sections 303 and 308 and in modulation sections 304 and 309.

Note that, in the event of a conventional PDCCH, "4" and "8" are supported as the number of CCE aggregations of common search spaces, and "1," "2," "4," and "8" are supported as the number of CCE aggregations of UE-specific search spaces. Also, in the event of an extended PDCCH, "4" and "8" are supported as the number of eCCE aggregations of common search spaces, and "1," "2," "4," and "8" are supported as the number of eCCE aggregations of UE-specific search spaces.

The baseband signal processing section 204 has channel coding sections 303, modulation sections 304 and mapping sections 305 to support the maximum number of users to multiplex, N, in one component carrier. The channel coding sections 303 perform channel coding of user data that is output from the data generating sections 301 (including part of higher control signals) on a per user basis. The modulation sections 304 modulate the user data having been subjected to channel coding, on a per user basis. The mapping sections 305 map the modulated user data to resource blocks (PRBs).

Also, the baseband signal processing section 204 has downlink control information generating sections 306 that generate downlink control information. The downlink control information generating sections 306 generate downlink control information to be transmitted by the PDCCH, per user terminal 10. The downlink control information includes PDSCH allocation information (DL grants), PUSCH allocation information (UL grants) and so on. The PUSCH allocation information (UL grants) is generated using, for example, DCI formats such as DCI format 0/4, and the PDSCH allocation information (DL grants) is generated using, for example, DCI formats such as DCI format 1A. When cross-carrier scheduling is performed, an identification field (CIF) to identify the cross-carrier CCs is added to each DCI format.

Also, the baseband signal processing section 204 has a CFI generating section 307 that generates CFI. As described above, CFI shows the number of OFDM symbols where the conventional PDCCH is allocated in each subframe. The CFI value is changed between 1 and 3, based on the downlink signal received quality in the user terminal 10, and so on.

Also, the baseband signal processing section 204 has channel coding sections 308 and modulation sections 309 to match the maximum number of users to multiplex, N, in one component carrier. The channel coding sections 308 perform channel coding of the downlink control information generated in the downlink control information generating sections 306, per user terminal 10, and also perform channel coding of the CFI generated in the CFI generating section 307. The modulation sections 309 modulate the downlink control information and CFI after channel coding.

A measurement reference signal generating section 311 generates measurement reference signals (CRSs: Cell-specific Reference Signals). The measurement reference signals (CRSS) are output to an IFFT section 315, which will be described later.

A demodulation reference signal generating section 317 generates user-specific demodulation reference signals (also referred to as DM-RSs, DRSs, UE-specific RSs, and so on). In MIMO transmission, the demodulation reference signal generating section generates demodulation reference signals with respect to each of a plurality of antenna ports to match the number of transmission layers. The demodulation reference signals (DM-RSs) are output to a weight multiplication section 318, which will be described later, and are multiplexed with user data output from the mapping sections 305 or downlink control information output from a mapping section 314.

The downlink control information that is modulated on a per user basis in the modulation sections 309 is multiplexed in a control channel multiplexing section 312. The downlink control information that is transmitted in the existing downlink control channel (PDCCH) is output to an interleaving section 313 and interleaved in the interleaving section 313. On the other hand, downlink control information that is transmitted in an extended downlink control channel (extended PDCCH) is output to the mapping section 314.

The mapping section 314 maps the downlink control information to be transmitted by the extended PDCCH to enhanced control channel elements (eCCEs), which are the allocation unit of extended PDCCHs. Note that an eCCE refers to a predetermined resource region that is formed by dividing a resource block (PRB) or a resource block group (RBG). Note that the mapping section 314 may also distribute the eCCEs allocated to the extended PDCCH over the entire system band, using distributed mapping. Alternatively, the mapping section 314 may also concentrate the eCCEs allocated to the extended PDCCH in part of the system band using localized mapping.

The downlink control information that is output from the mapping section 314 and the user data that is output from the mapping sections 305 are input in a weight multiplication section 318. Also, the demodulation reference signals (DM-RSs) generated in the demodulation reference signal generating section 317 are input in the weight multiplication section 318.

The weight multiplication section 318 performs the pre-coding process (phase and/or amplitude shift) using predetermined weights. When executing beam forming, the weight multiplication section 318 uses user-specific weights (beam forming weights) and multiplies the user data that is input from the mapping sections 305 and the DM-RSs that are input from the demodulation reference signal generating section 317, by the user-specific weights. Also, the weight multiplication section 318 multiplies the downlink control information (extended PDCCH) that is input from the mapping section 314 and the DM-RSs that are input from the demodulation reference signal generating section 317, by the user-specific weights. As described above, when DM-RSs correspond to a plurality of transmission layers, a plurality of antenna ports to match the number of transmission layers of the DM-RSs are grouped into a plurality of groups, and one group out of the plurality of groups is reported to the user terminal 10. Also, in each group, the resource regions (eCCEs or eREGs) that are frequency-division-multiplexed in a resource block and the antenna ports to constitute the group are associated with each other. In the group reported to the user terminal 10, the weight multiplication section 318 multiplies the DM-RSs to correspond to the antenna ports associated with the resource regions (eCCEs or eREGs) allocated to the extended PDCCH, by the same weight as the weight by which the extended PDCCH is multiplied. The transmission signal after precoding is input in the IFFT section 315.

Also, the downlink control information that is output from the interleaving section 313 is input in the IFFT section 315. Also, the measurement reference signals (CRSs) that are generated in the measurement reference signal generating section 311 are input in the IFFT section 315. The IFFT section 315 performs an inverse fast Fourier transform of the input signals and converts the frequency domain signals into time sequence signals. A cyclic prefix inserting section 316 inserts cyclic prefixes in the time sequence signals of downlink channel signals. Note that a cyclic prefix functions as a guard interval for cancelling the differences in multipath propagation delay. The transmission data, to which cyclic prefixes have been added, is transmitted to the transmitting/receiving sections 203.

Figure 15:
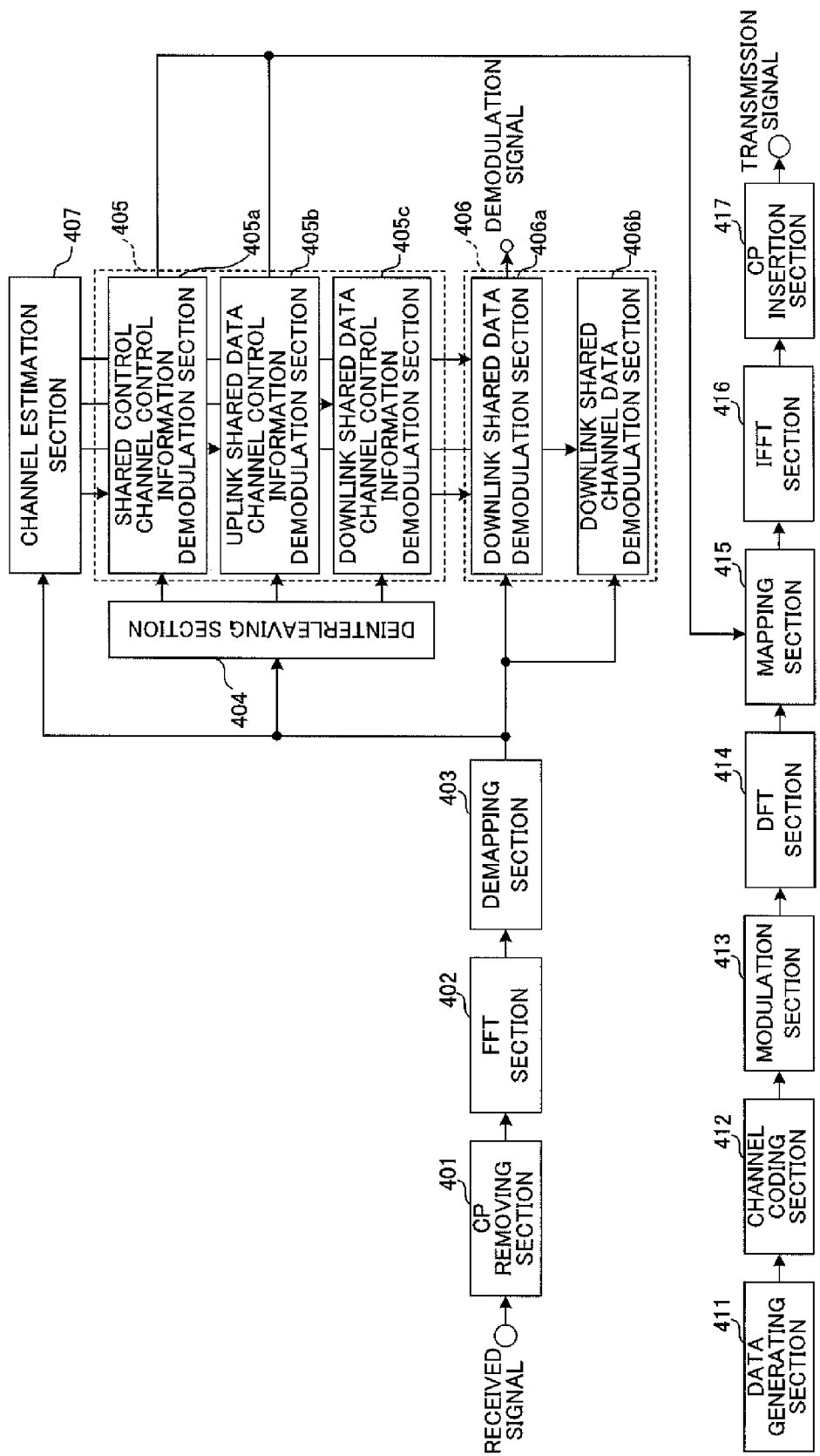
FIG. 15 is a functional block diagram of a baseband processing section of a user terminal according to an embodiment.

FIG. 15 is a functional block diagram of the baseband signal processing section 104 provided in the user terminal 10 and shows function blocks of an LTE-A terminal which supports LTE-A. First, the downlink configuration of the user terminal 10 will be described.

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal in a demapping section 403. The demapping section 403 demaps the downlink signal, and extracts, from the downlink signal, multiplex control information in which a plurality of pieces of control information are multiplexed, user data, and higher control information. Note that the demapping process by the demapping section 403 is performed based on higher control information that is received as input from the application section 105. The multiplex control information that is output from the demapping section 403 is deinterleaved in a deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section 405*a* that demodulates downlink shared control channel control information from the multiplex control information, an uplink shared data channel control information demodulation section 405*b* that demodulates uplink shared data channel control information from the multiplex control information, and a downlink shared data channel control information demodulation section 405*c* that demodulates downlink shared data channel control information from the multiplex control information. The data demodulation section 406 has a downlink shared data demodulation section 406*a* that demodulates the user data and higher control signals, and a downlink shared channel data demodulation section 406*b* that demodulates downlink shared channel data.

The shared control channel control information demodulation section 405*a* extracts shared control channel control information, which is control information that is common between users, by, for example, performing a blind decoding process of the common search spaces of the downlink control channel (PDCCH) and extended downlink control channel (extended PDCCH), a demodulation process, a channel decoding process and so on. The shared control channel control information includes downlink channel quality information (CQI), and therefore is input in a mapping section 415 and mapped as part of transmission data for the radio base station apparatus 20. In the event of a conventional PDCCH, the blind decoding process is performed with respect to a plurality of candidate CCEs signaled as common search spaces. Also, in the event of an extended PDCCH, the blind decoding process is performed with respect to a plurality of candidate eCCEs signaled as common search spaces.

The uplink shared data channel control information demodulation section 405*b* extracts uplink shared data channel control information (for example, UL grants), by, for example, performing a blind decoding process of the UE-specific search spaces of the downlink control channel (PDCCH) and extended downlink control channel (extended PDCCH), a demodulation process, a channel decoding process and so on. In the event of a conventional PDCCH, the blind decoding process is performed with respect to a plurality of candidate CCEs signaled as UE-specific search spaces. Also, in the event of an extended PDCCH, the blind decoding process is performed with respect to a plurality of candidate eCCEs signaled as UE-specific search spaces. The demodulated uplink shared data channel control information is input in the mapping section 415 and used to control the uplink shared data channel (PUSCH).

The downlink shared data channel control information demodulation section 405*c* extracts downlink shared data channel control information (for example, DL assignments) by performing a blind decoding process of the UE-specific search spaces of the downlink control channel (PDCCH) and the extended downlink control channel (extended PDCCH), a demodulation process, a channel decoding process and so on. In the event of a conventional PDCCH, the blind decoding process is performed with respect to a plurality of candidate CCEs signaled as UE-specific search spaces. Also, in the event of an extended PDCCH, the blind decoding process is performed with respect to a plurality of candidate eCCEs signaled as UE-specific search spaces. The demodulated downlink shared data channel control information is input in the downlink shared data demodulation section 406*a*, and is used to control the downlink shared data channel (PDSCH), and is input in the downlink shared data demodulation section 406*a*.

The downlink shared data demodulation section 406*a* acquires user data and higher control information based on the downlink shared data channel control information that is input from the downlink shared data channel control information demodulation section 405*c*. The PRB positions (or RBG positions) where extended PDCCHs can be mapped, included in the higher control information, are output to the downlink shared data channel control information demodulation section 405*c*. The downlink shared channel data demodulation section 406*b* demodulates downlink shared channel data based on the uplink shared data channel control information that is input from the uplink shared data channel control information demodulation section 405*b*. Also, the higher control information includes group information that represents the group for which channel estimation is performed and which is formed with a plurality of antenna ports. The downlink shared data demodulation section 406*a* constitutes an acquisition section according to the present invention.

The channel estimation section 407 performs channel estimation using demodulation reference signals (DM-RSs) or cell-specific reference signals (CRSs). When demodulating a conventional PDCCH, the channel estimation section 407 performs channel estimation using cell-specific reference signals. On the other hand, when demodulating an extended PDCCH and user data, the channel estimation section 407 performs channel estimation using demodulation reference signals (DM-RSs). To be more specific, the channel estimation section 407 estimates the weights, by which the demodulation reference signals (DM-RSs) corresponding to each antenna port constituting the group reported from the radio base station apparatus 20 are multiplied. The channel estimation section 407 constitutes an estimation section according to the present invention.

The channel estimation section 407 outputs the channel estimation values to the shared control channel control information demodulation section 405a, the uplink shared data channel control information demodulation section 405b, the downlink shared data channel control information demodulation section 405c and the downlink shared data demodulation section 406a. In these demodulation sections, the demodulation process is performed using estimated channel estimation values.

When demodulating an extended PDCCH, the downlink shared data demodulation section 406a uses the weight estimation values of the antenna ports that are associated with the resource region where the extended PDCCH is allocated, in the group reported from the radio base station apparatus 20. In the radio base station apparatus 20, the DM-RSs of the antenna ports and the extended PDCCH are multiplied by the same weight (beam forming weight that is dedicated to the user terminal 10), so that it is possible to achieve beam forming gain by demodulating the extended PDCCH using the weight estimation values of the antenna ports.

The baseband signal processing section 104 has, as function blocks of the transmission processing system, a data generating section 411, a channel coding section 412, a modulation section 413, a DFT section 414, a mapping section 415, an IFFT section 416, and an CP inserting section 417. The data generating section 411 generates transmission data from bit data that is received as input from the application section 105. The channel coding section 412 performs channel coding processes such as error correction for the transmission data, and the modulation section 413 modulates the transmission data after channel coding by QPSK and so on.

The DFT section 414 performs a discrete Fourier transform on the modulated transmission data. The mapping section 415 maps the frequency components of the data symbols after the DFT to subcarrier positions designated by the radio base station apparatus 20. The IFFT section 416 converts the input data, which corresponds to the system band, into time sequence data, by performing an inverse fast Fourier transform, and the CP inserting section 417 inserts cyclic prefixes in the time sequence data in data units.

As described above, with the radio base station apparatus 20 according to the present embodiment, a plurality of antenna ports to match the number of transmission layers are grouped into a plurality of groups, and one of these plurality of groups is reported to the user terminal 10. Consequently, the user terminal 10 according to the present embodiment has only to perform channel estimation with respect to the DM-RSs of the antenna ports belonging to the group reported from the radio base station apparatus 20, so that, compared to the case of performing channel estimation for the DM-RSs of all antenna ports, it is possible to simplify the process pertaining to channel estimation. Also, in each group, the antenna ports belonging to each group and the resource regions (for example, eCCEs and eREGs) that are frequency-division-multiplexed in a PRB are associated with each other, so that it is possible to reduce the occurrence of blocking. In this way, with the radio communication system 1 according to the present embodiment, it is possible to simplify the process pertaining to channel estimation in user terminals 10, and furthermore reduce the occurrence of blocking between user terminals 10 where the same antenna ports are allocated.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-062690, filed on Mar. 19, 2012, including the specification, drawings and abstract, is incorporated herein by reference in its entirety.

The invention claimed is:

1. A radio base station apparatus comprising:
    a multiplication section configured to multiply downlink control information allocated to an extended downlink control channel resource region in a resource block, by a user terminal-specific weight; and
    a reporting section configured to report one group, among a plurality of groups that are configured by selecting different antenna ports from a plurality of antenna ports corresponding to the number of transmission layers of a demodulation reference signal, to the user terminal, wherein:
    in each group, extended downlink control channel resource regions in the resource block and antenna ports to constitute the group are associated with each other; and
    the multiplication section multiplies a demodulation reference signal corresponding to an antenna port in the one group that is associated with the extended downlink control channel resource regions where the downlink control information is allocated, by the weight.

2. The radio base station apparatus according to claim 1, wherein, in each group, the extended downlink control channel resource regions in the resource block and the antenna ports to constitute the group are associated with each other on a per aggregation level basis.

3. The radio base station apparatus according to claim 1, wherein each group is formed with a plurality of antenna ports where demodulation reference signals are orthogonalized by frequency division multiplexing.

4. The radio base station apparatus according to claim 1, wherein each group is formed with a plurality of antenna ports where the demodulation reference signals are orthogonalized by code division multiplexing.

5. The radio base station apparatus according to claim 1, wherein the extended downlink control channel resource regions comprise enhanced control channel elements (eCCEs).

6. The radio base station apparatus according to claim 1, wherein the extended downlink control channel resource regions comprise enhanced resource element groups (eREGs).

7. The radio base station apparatus according to claim 1, wherein the extended downlink control channel resource regions are frequency-division-multiplexed in the resource block.

8. The radio base station apparatus according to claim 1, wherein, when the number of transmission layers is four, the reporting section reports, to the user terminal, one group of two groups that are formed by selecting two different antenna ports from four antenna ports.

9. A user terminal comprising:
an acquisition section configured to acquire group information, which represents one group reported from a radio base station apparatus among a plurality of groups that are formed by selecting different antenna ports from a plurality of antenna ports corresponding to the number of transmission layers of a demodulation reference signal;
an estimation section configured to estimate weights by which demodulation reference signals to correspond to antenna ports belonging to the one group are multiplied; and
a demodulation section configured to demodulate downlink control information, wherein:
in each group, extended downlink control channel resource regions in a resource block and antenna ports to constitute the group are associated with each other; and
the demodulation section demodulates the downlink control information using weight an estimation value of an antenna port in the one group that is associated with the extended downlink control channel resource regions where the downlink control information is allocated.

10. A radio communication method comprising the steps of:
at a radio base station apparatus:
multiplying downlink control information allocated to an extended downlink control channel resource region in a resource block, by a user terminal-specific weight; and
reporting one group, among a plurality of groups that are configured by selecting different antenna ports from a plurality of antenna ports corresponding to the number of transmission layers of a demodulation reference signal, to the user terminal, wherein:
in each group, the extended downlink control channel resource regions in the resource block and antenna ports to constitute the group are associated with each other; and
in the step of multiplication, the radio base station apparatus multiplies a demodulation reference signal corresponding to an antenna port associated with the extended downlink control channel resource regions where the downlink control information is allocated in the one group, by the weight.

11. The radio communication method according to claim 10, further comprising the steps of:
at the user terminal:
acquiring group information, which represents the one group reported from the radio base station apparatus;
estimating weights by which demodulation reference signals to correspond to antenna ports belonging to the one group are multiplied; and
demodulating the downlink control information,
wherein, in the step of demodulation, the user terminal demodulates the downlink control information using a weight estimation value of an antenna port in the one group that is associated with the extended downlink control channel resource regions where the downlink control information is allocated.

12. A radio communication system comprising:
a radio base station apparatus comprising:
a multiplication section configured to multiply downlink control information allocated to an extended downlink control channel resource region in a resource block, by a user terminal-specific weight; and
a reporting section configured to report one group, among a plurality of groups that are configured by selecting different antenna ports from a plurality of antenna ports corresponding to the number of transmission layers of a demodulation reference signal, to the user terminal; and
a user terminal comprising:
an acquisition section configured to acquire group information, which represents the one group reported from the radio base station apparatus;
an estimation section configured to estimate weights by which demodulation reference signals to correspond to antenna ports belonging to the one group are multiplied; and
a demodulation section configured to demodulate the downlink control information, wherein:
in each group, extended downlink control channel resource regions in the resource block and antenna ports to constitute the group are associated with each other;
the multiplication section multiplies a demodulation reference signal corresponding to an antenna port in the one group that is associated with the extended downlink control channel resource regions where the downlink control information is allocated, by the weight; and
the demodulation section demodulates the downlink control information using a weight estimation value of the antenna port in the one group that is associated with the extended downlink control channel resource regions where the downlink control information is allocated.

13. The radio base station apparatus according to claim 2, wherein each group is formed with a plurality of antenna ports where demodulation reference signals are orthogonalized by frequency division multiplexing.

14. The radio base station apparatus according to claim 2, wherein each group is formed with a plurality of antenna ports where the demodulation reference signals are orthogonalized by code division multiplexing.

* * * * *